United States Patent
Lim et al.

(10) Patent No.: US 9,386,530 B2
(45) Date of Patent: Jul. 5, 2016

(54) METHOD FOR REDUCING TRANSMISSION POWER AND TERMINAL THEREOF

(71) Applicant: LG ELECTRONICS INC., Seoul (KR)

(72) Inventors: Su Hwan Lim, Seoul (KR); Sang Wook Lee, Seoul (KR); Jin Yup Hwang, Seoul (KR); Man Young Jung, Seoul (KR); Yoon Oh Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 13/960,477

(22) Filed: Aug. 6, 2013

(65) Prior Publication Data

US 2014/0044063 A1    Feb. 13, 2014

Related U.S. Application Data

(60) Provisional application No. 61/680,682, filed on Aug. 7, 2012, provisional application No. 61/682,307, filed on Aug. 13, 2012.

(51) Int. Cl.
*H04W 52/04* (2009.01)
*H04W 52/34* (2009.01)

(52) U.S. Cl.
CPC .............. *H04W 52/04* (2013.01); *H04W 52/34* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2010/0255868 | A1* | 10/2010 | Lee ...................... | H04W 52/367 455/509 |
| 2012/0075989 | A1* | 3/2012 | Roessel ................ | H04W 72/04 370/230 |
| 2012/0083309 | A1* | 4/2012 | Kwon et al. .................. | 455/522 |
| 2013/0114505 | A1* | 5/2013 | Haim .................. | H04W 52/146 370/328 |
| 2013/0115997 | A1* | 5/2013 | Immonen ............ | H04W 52/367 455/522 |
| 2013/0148591 | A1* | 6/2013 | Lim .................. | H04W 72/0453 370/329 |
| 2013/0182661 | A1* | 7/2013 | Piipponen et al. ............ | 370/329 |
| 2013/0182663 | A1* | 7/2013 | Ji ...................... | H04W 72/0473 370/329 |
| 2014/0044063 | A1* | 2/2014 | Lim ...................... | H04W 52/04 370/329 |
| 2014/0321304 | A1* | 10/2014 | Yu et al. ........................ | 370/252 |
| 2015/0031409 | A1* | 1/2015 | Ahn et al. ...................... | 455/522 |

OTHER PUBLICATIONS

3GPP TS 36.101 version 10.6.0 Release 10.*

* cited by examiner

*Primary Examiner* — Brandon Renner
*Assistant Examiner* — Deepa Belur
(74) *Attorney, Agent, or Firm* — Birch, Stewart, Kolasch & Birch, LLP

(57) ABSTRACT

There is provided a method of reducing transmission power. The method may comprise: receiving a network signal, if a carrier aggregation (CA) is configured and if the configured CA corresponds to an intra-band contiguous CA; applying an additional maximum power reduction (A-MPR) for a transmission, based on the network signal. If a configuration of the CA corresponds to a CA_1C and if the aggregated transmission bandwidth is the summation of 75 RBs and 75 RBs, a value of the A-MPR is specified for L_CRB>10. The L_CRB is a length of a contiguous resource block allocation.

10 Claims, 24 Drawing Sheets

(a)

(b)

(a)

(b)

(c)

METHOD FOR REDUCING TRANSMISSION POWER AND TERMINAL THEREOF

CROSS-REFERENCE TO RELATED APPLICATIONS

This application claims the benefit of priority of U.S. Provisional applications No. 61/680,682 filed on Aug. 7, 2012 and No. 61/682,307 filed on Aug. 13, 2012, all of which are incorporated by reference in their entirety herein.

TECHNICAL FIELD

The present invention relates to a method for reducing transmission power and terminal thereof.

BACKGROUND ART

A 3rd generation partnership project (3GPP) long term evolution (LTE) that improves a universal mobile telecommunications system (UMTS) has been introduced to a 3GPP release 8.

The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

FIG. 1 is view of an evolved mobile communication network;

As known in FIG. 1, a wireless communication system includes at least one base station (BS) 20. Each base station 20 provides communication services for specific geographical areas (generally referred to as cells) 20a, 20b and 20c.

In this case, communications from a base station to a terminal is called as a downlink (DL) and communication from the terminal to the base station is called as an uplink (UL).

If base stations by several service providers are present in each geographical area 20a, 20b, 20c, they may occurs interference with each other.

To eliminate this interference, each service provider can provide services with different frequency bands.

However, if the frequency bands of each service provider are adjacent to each other, the interference problem still exists. This interference problem can be solved by increasing substantial frequency intervals between adjacent bands such that transmission power may be reduced or the amount of transmission resource block (RB) may be limited. However, if the transmission power may be reduced simply, since service coverage is also reduced accordingly, a measure to reduce the transmission power at an appropriate level is required without causing the interference problem.

DISCLOSURE OF THE INVENTION

Therefore, one disclosure of the specification is to provide a measure to reduce the transmission power at an appropriate level.

To achieve these and other advantages and in accordance with the purpose of the present invention, as embodied and broadly described herein, there is provided a method of reducing transmission power. The method may comprise: receiving a network signal, if a carrier aggregation (CA) is configured and if the configured CA corresponds to an intra-band contiguous CA; applying an additional maximum power reduction (A-MPR) for a transmission, based on the network signal. If a configuration of the CA corresponds to a CA_1C and if the aggregated transmission bandwidth is the summation of 75 RBs and 75 RBs, a value of the A-MPR is specified for L_CRB>10. The L_CRB is a length of a contiguous resource block allocation.

The CA_1C may be related to an aggregation of 100~200 resource blocks. And, the CA_1C may be related to an operating band 1 defined in 3GPP.

The method may further comprise; receiving information on an uplink resource allocated by a base station.

The method may further comprise; receiving system information from a base station. The system information may contain at least one of: information on an operating band, information on an uplink bandwidth, and information on an uplink carrier frequency. The information on the uplink bandwidth may contain information on the number of RBs.

If the configuration of the CA corresponds to a CA_1C, if the aggregated transmission bandwidth is the summation of 75 RBs and 75 RBs, and if $L_{CRB}>10$, the value of the A-MPR may be about 6 dB.

If the aggregated transmission bandwidth is the summation of 75 RBs and 75 RBs and if $L_{CRB}<=10$, the value of the A-MPR may be about 11 dB. If the aggregated transmission bandwidth is the summation of 75 RBs and 75 RBs and if $L_{CRB}>44$, the value of the A-MPR may be about 5 dB.

If the aggregated transmission bandwidth is the summation of 100 RBs and 100 RBs and if $L_{CRB}>0$, the value of the A-MPR may be about 12 dB. Also, if the aggregated transmission bandwidth is the summation of 00 RBs and 100 RBs and if $L_{CRB}>64$, the value of the A-MPR may be about 6 dB.

To achieve these and other advantages and in accordance with the purpose of the present invention, as embodied and broadly described herein, there is also provided a terminal for performing an uplink transmission with the reduced transmission power. The terminal may comprise: a radio frequency (RF) unit con figured to receive a network signal, if a carrier aggregation (CA) is configured and if the configured CA corresponds to an intra-band contiguous CA; and a processor confirmed to apply an additional maximum power reduction (A-MPR) for a transmission, based on the network signal. If a configuration of the CA corresponds to a CA_1C and if the aggregated transmission bandwidth is the summation of 75 RBs and 75 RBs, a value of the A-MPR may be specified for $L_{CRB}>10$. Here, the $L_{CRB}$ may be a length of a contiguous resource block allocation.

MODES FOR CARRYING OUT THE PREFERRED EMBODIMENTS

Figure 1:
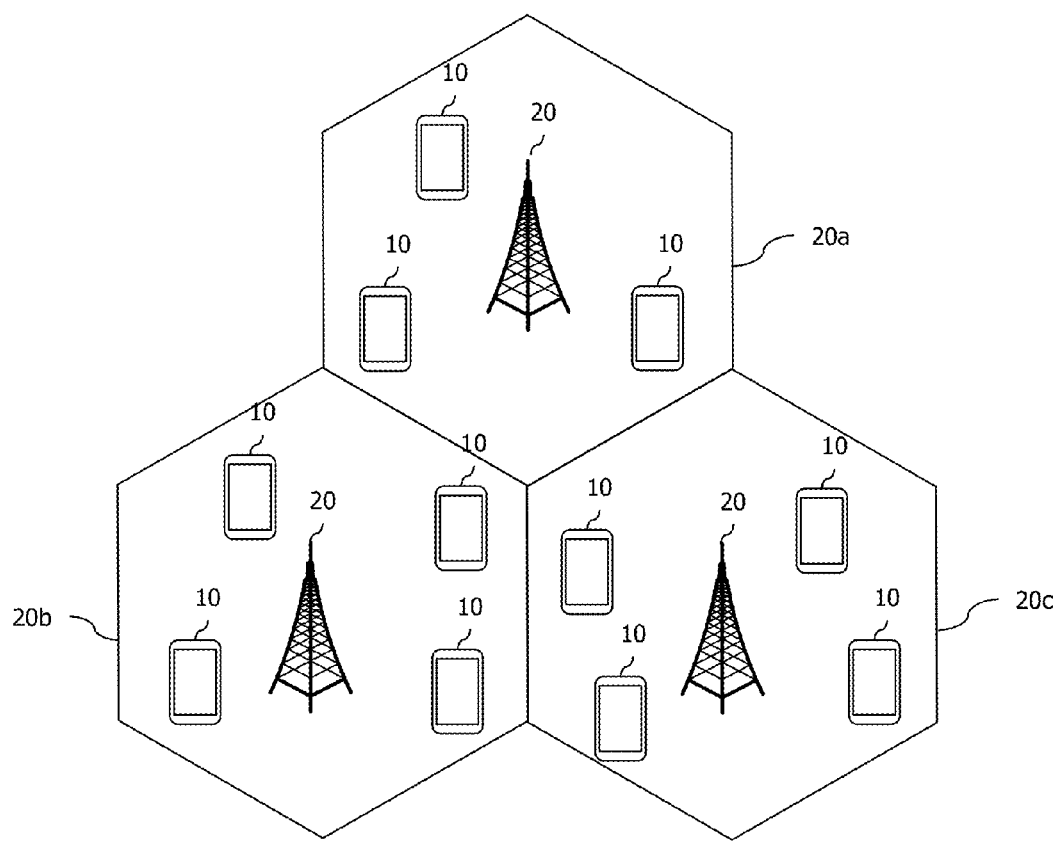
FIG. 1 is view of an evolved mobile communication network.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary terminal in accompanying drawings, however the terminal may be referred to as terms such as a user equipment (UE), a mobile equipment (ME), a mobile station (MS), a user terminal (UT), a subscriber station (SS), a wireless device (WD), a handheld device (HD), an access terminal (AT), and etc. And, the terminal may be implemented as a portable device such as a notebook, a mobile phone, a PDA, a smart phone, a multimedia device, etc, or as an unportable device such as a PC or a vehicle-mounted device.

Figure 2:
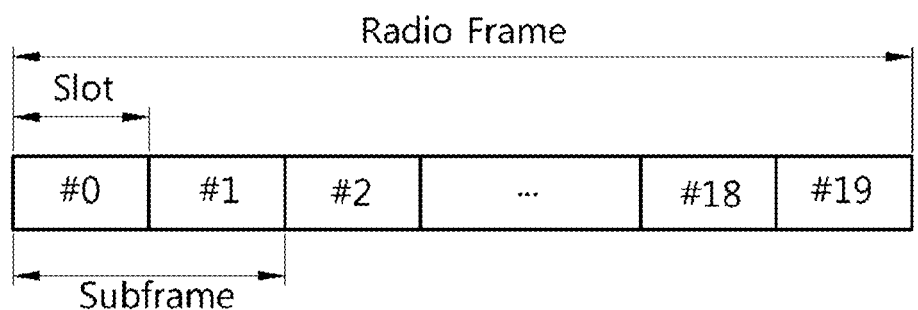
FIG. 2 illustrates a structure of a radio frame according to FDD mode specified in a 3rd generation partnership project (3GPP) long term evolution (LTE)

FIG. 2 illustrates a structure of a radio frame according to FDD mode specified in a 3rd generation partnership project (3GPP) long term evolution (LTE)

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. The OFDM symbol is for representing one symbol period. The OFDM symbol can be referred to as other terms. For example, the OFDM symbol can also be referred to as an orthogonal frequency division multiple access (OFDMA) symbol or, when single carrier-frequency division multiple access (SC-FDMA) is used as an uplink multiple-access scheme, can also be referred to as an SC-FDMA symbol.

In 3GPP LTE, it is defined such that one slot includes 7 OFDM symbols in a normal cyclic prefix (CP) and one slot includes 6 OFDM symbols in an extended CP.

The above radio frame structure is shown for exemplary purposes only. Thus, the number of subframes included in the radio frame or the number of slots included in the subframe or the number of OFDM symbols included in the slot may change variously.

Figure 3:
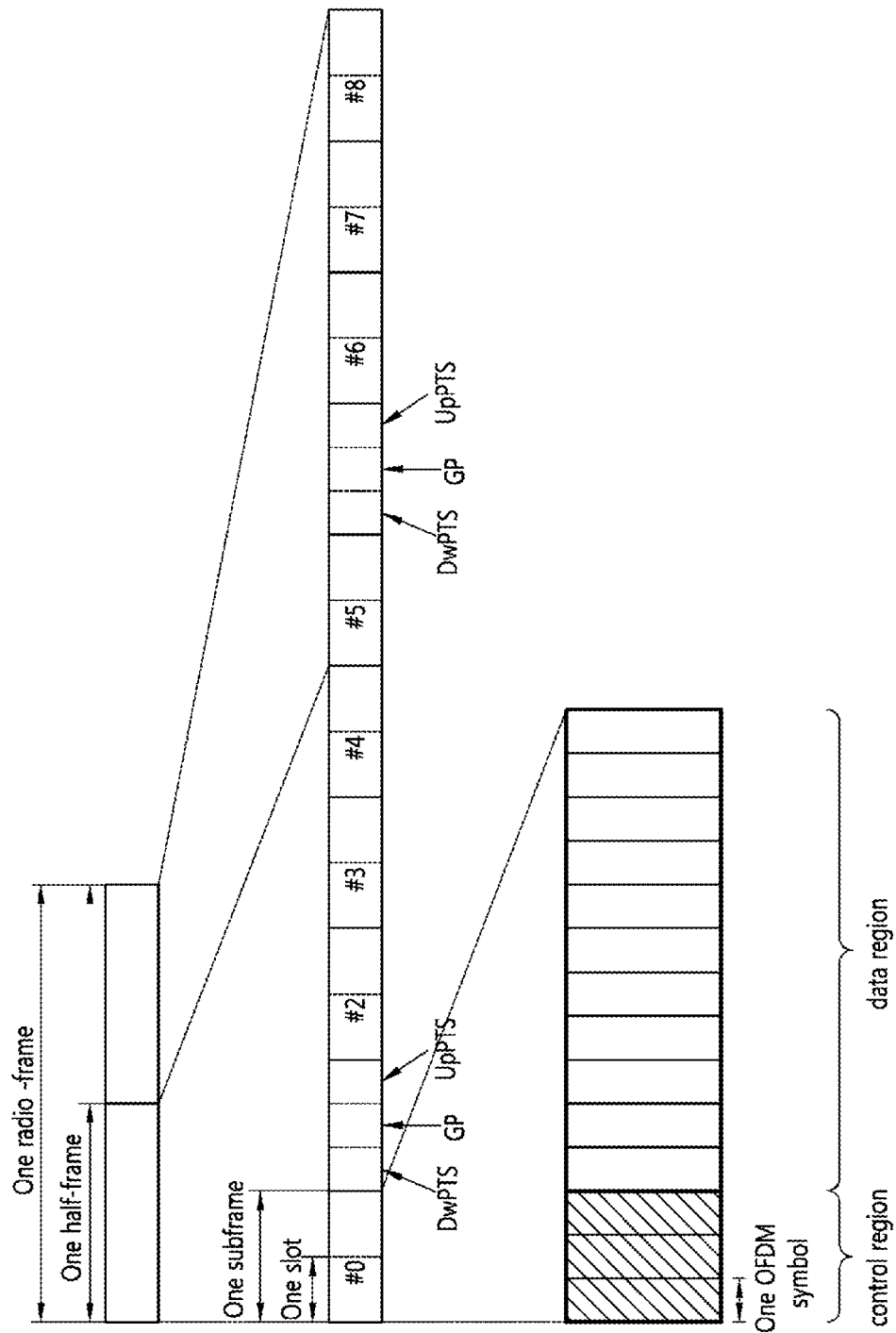
FIG. 3 shows a downlink radio frame structure according to a TDD mode specified in a 3rd generation partnership project (3GPP) long term evolution (LTE).

FIG. 3 shows a downlink radio frame structure according to a TDD mode specified in a 3rd generation partnership project (3GPP) long term evolution (LTE).

The section 4 of 3GPP TS 36.211 V8.7.0 (2009-05) "Evolved Universal Terrestrial Radio Access (E-UTRA); Physical Channels and Modulation (Release 8)" may be incorporated herein by reference for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe,
'U' denotes a UL subframe, and
'S' denotes a special subframe.
When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a 1st slot in the subframe. However, the number of OFDM symbols included in the control region may vary. A physical downlink control channel (PDCCH) is allocated to the control region, and a physical downlink shared channel (PDSCH) is allocated to the data region.

Figure 4:
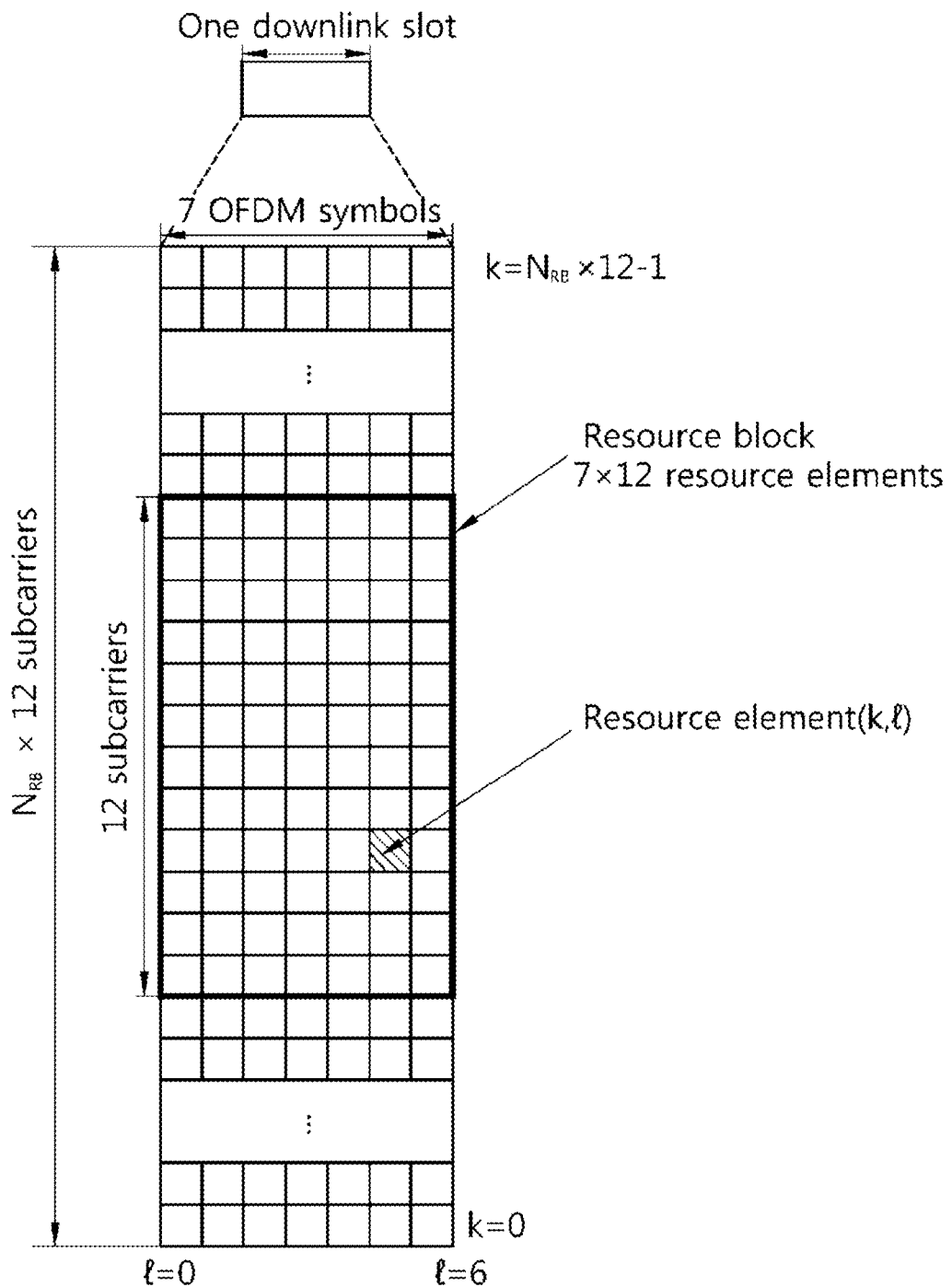
FIG. 4 illustrates an example of a resource grid for one downlink slot or one uplink slot according to 3GPP LTE.

FIG. 4 illustrates an example of a resource grid for one downlink slot or one uplink slot according to 3GPP LTE.

Referring to FIG. 4, the downlink slot includes a plurality of OFDM symbols in a time domain and a plurality of NRB resource blocks (RBs) in a frequency domain. The RB is a resource allocation unit, and includes one slot in the time domain and a plurality of contiguous subcarriers in the frequency domain.

The number NRB of RBs included in the downlink slot depends on a downlink transmission bandwidth determined in a cell. For example, in an LTE system, NRB may be any one value in the range of 6 to 110. An uplink slot may have the same structure as the downlink slot.

Each element on the resource grid is referred to as a resource element (RE). The RE on the resource grid can be identified by an index pair (k, l) within the slot. Herein, k(k= 0, . . . , NRB×12-1) denotes a subcarrier index in the frequency domain, and l(l=0, . . . , 6) denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 5:
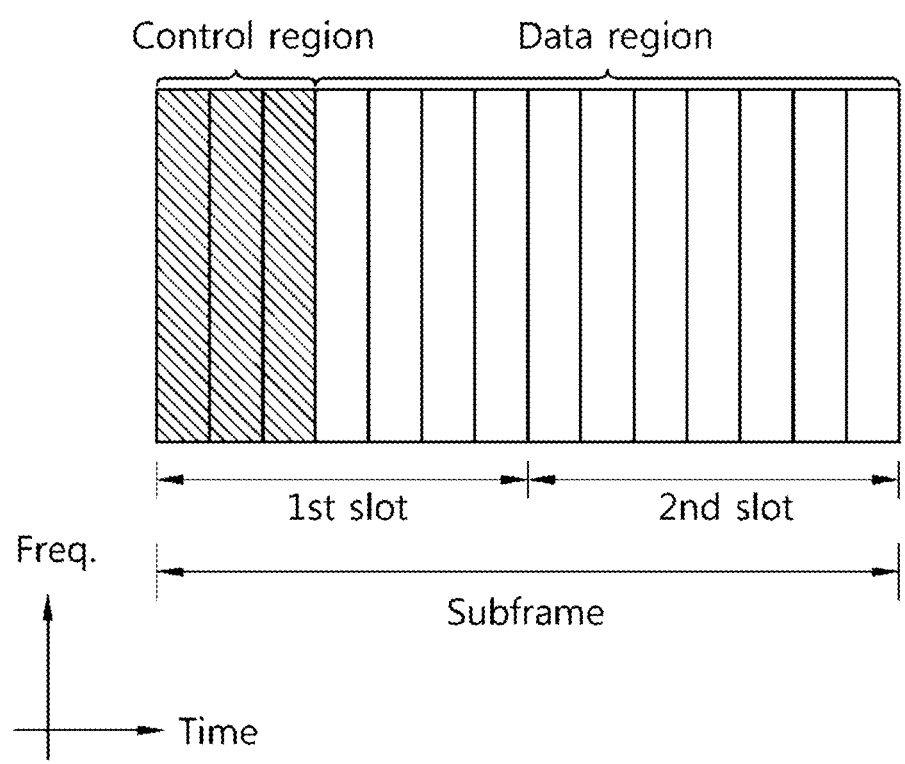
FIG. 5 shows a downlink radio frame structure in 3rd generation partnership project (3GPP) long term evolution (LTE).

FIG. 5 shows a downlink radio frame structure in 3rd generation partnership project (3GPP) long term evolution (LTE).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

DL (downlink) subframe is divided into a control region and a data region in time domain. The control region includes maximum of 4 preceding OFDM symbols of the first slot in the subframe, though the number of OFDM symbols included in the control region can be changed. In the control region, Physical Downlink Control Channel (PDCCH) and other control channels are allocated, and in the data region, Physical Downlink Shared Channel (PDSCH) is allocated.

As disclosed in the 3GPP TS 36.211 V10.4.0, the 3GPP LTE/LTE-A defines a physical channel, including a PDCCH, a Physical Control Format Indicator Channel (PCFICH), and a Physical Hybrid-ARQ Indicator Channel (PHICH). Also, control signals transmitted from a physical layer include a Primary Synchronization Signal (PSS), a Secondary Synchronization Signal (SSS), and a random access preamble.

The PCFICH transmitted in the first OFDM symbol of a subframe carries control format indicator (CFI) which indicates the number of OFDM symbols (namely, size of the control region) used for carrying control channels within a subframe. The UE first receives the CFI through the PCFICH and monitors the PDCCH. The PCFICH does not use blind decoding but transmitted through the fixed PCFICH resources of a subframe.

The PDCCH carries control information which is called downlink control information (DCI). DCI may include resource allocation of PDSCH (which is also called DL grant), resource allocation of PUSCH (which is called UL grant), and activation of a set of transmission power control commands for individual UEs within a UE group and/or voice over internet protocol (VoIP).

The PHICH carries ACK (positive acknowledgement)/NACK (negative acknowledgement) signal for UL hybrid automatic repeat request (HARQ). The ACK/NACK signal about the UL data on the PUSCH transmitted by the UE is transmitted through the PHICH.

Figure 6:
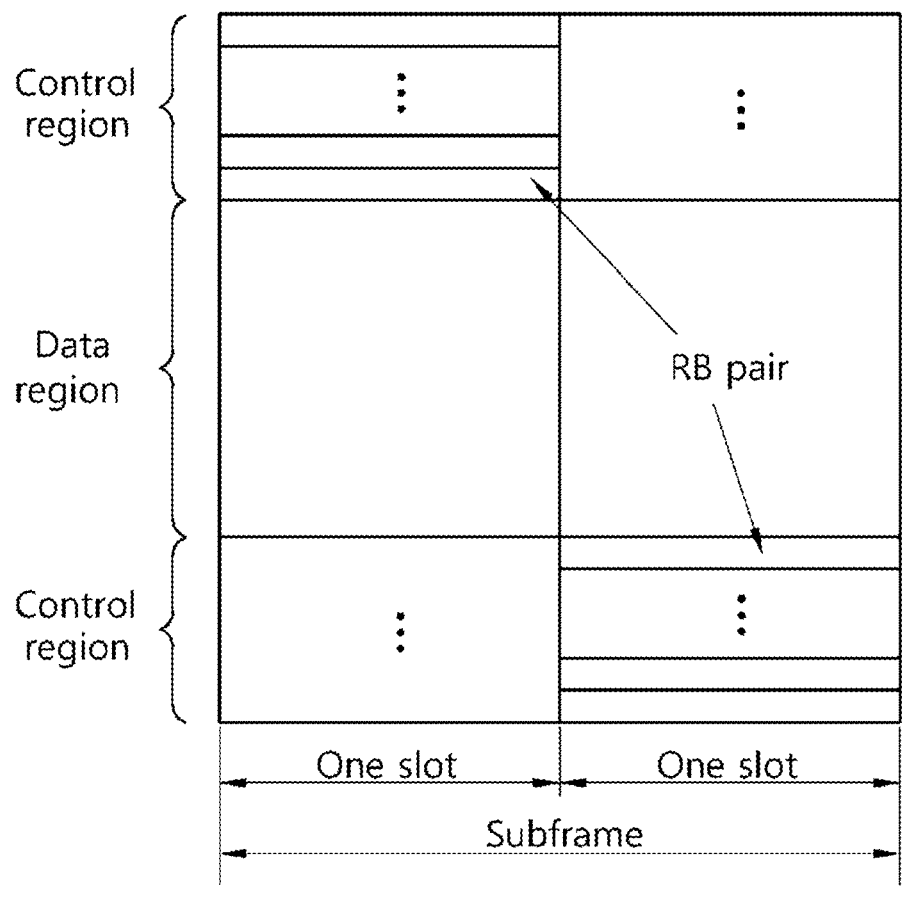
FIG. 6 shows the structure of an uplink subframe in 3rd generation partnership project (3GPP) long term evolution (LTE).

FIG. 6 shows the structure of an uplink subframe in 3rd generation partnership project (3GPP) long term evolution (LTE).

Referring FIG. 6, an uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a channel quality indicator (CQI), a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a 1st slot and a 2nd slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Figure 7:
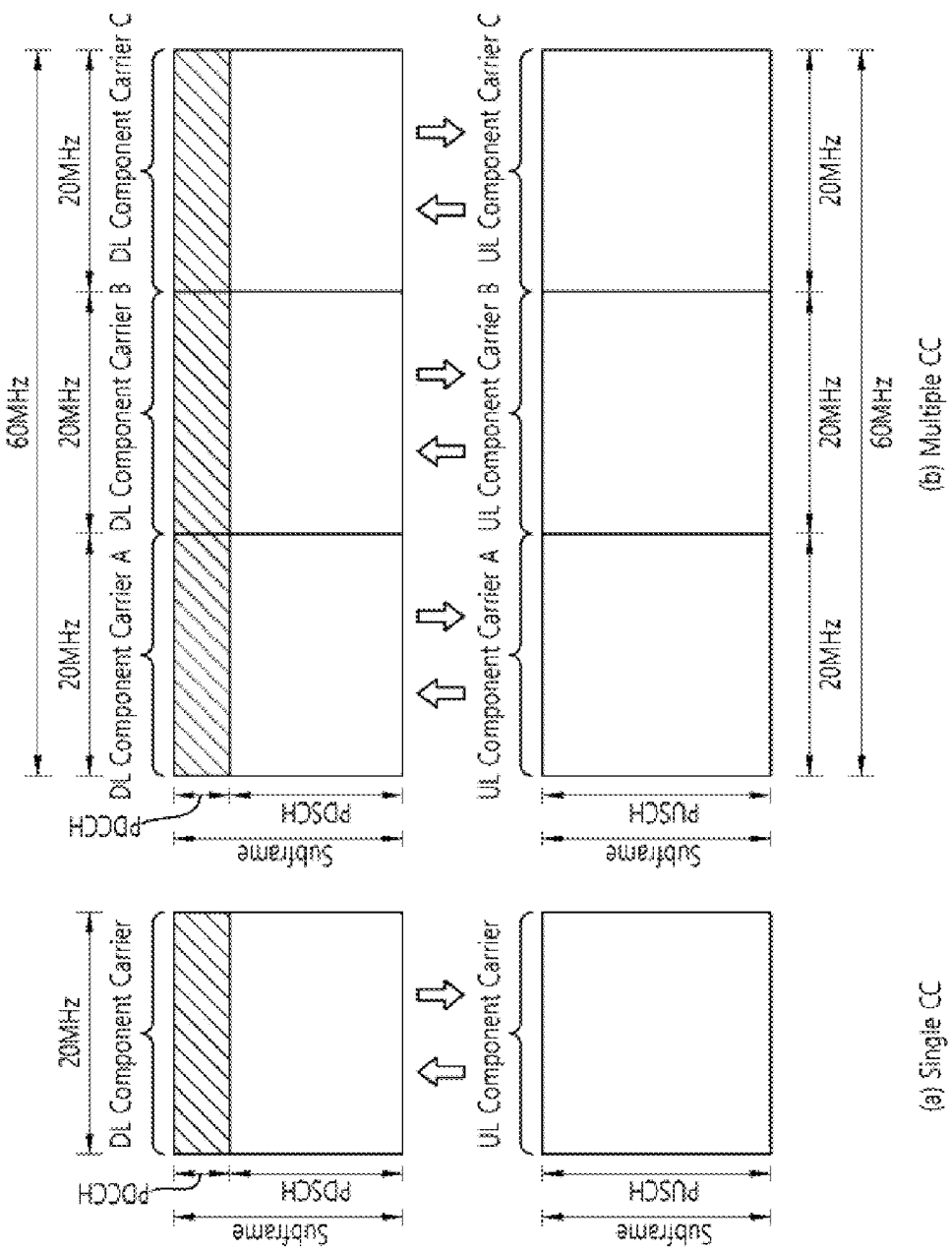
FIG. 7 illustrates an example of comparison between an existing single carrier system and a multi-carrier system.

FIG. 7 illustrates an example of comparison between an existing single carrier system and a multi-carrier system.

Referring to FIG. 7, in the single carrier system, only one carrier is supported for uplink and downlink with respect to the user equipment. Various bandwidths may be provided for the carrier, but only one carrier is assigned to the user equipment. On the contrary, in the multi-carrier system, a plurality of component carriers (DL CC A to C, and UL CC A to C) may be assigned to the user equipment. For example, three component carriers each having a frequency of 20 MHz may be assigned to the user equipment, so that a bandwidth of 60 MHz is assigned to the user equipment.

The multi-carrier system may be divided into a contiguous carrier aggregation system having carriers contiguous to each other and a non-contiguous carrier aggregation system having carriers away from each other. Hereinafter, when simply referred to as multi-carrier system, it should be construed as including both when the component carriers are contiguous to each other and when the component carriers are not contiguous to each other.

When one or more component carriers are aggregated, target component carriers may use, as is, the bandwidth used in the existing system for backward compatibility with the existing system. For example, in the 3GPP LTE system, bandwidths of 1.4 MHz, 3 MHz, 5 MHz, 10 MHz, 15 MHz and 20 MHz are supported, and in the 3GPP LTE-A system, a wideband of 20 MHz or more may be configured using only the bandwidth used in the 3GPP LTE system. Or, without using, as is, the bandwidth of the existing system, a new bandwidth may be defined to configure a wideband.

In the wireless communication system, the system band is separated into a plurality of carrier frequencies. Here, the carrier frequency means the center frequency of a cell. Hereinafter, the cell may mean a downlink frequency resource and an uplink frequency resource. Or, the cell may mean a combination of a downlink frequency resource and an optional uplink frequency resource. Or, in the case that carrier aggregation (CA) is generally not considered, one cell may have a pair of uplink and downlink frequency resources all the time. For packet data to be transmitted/received through a specific cell, the user equipment should first complete configuration of the specific cell. Here, the "configuration" means when it is complete to receive system information necessary for data transmission/reception on the corresponding cell. For example, the configuration may include the overall process of receiving common physical parameters necessary for data transmission/reception, MAC layer parameters, or parameters necessary for a specific operation at the RRC layer. The configuration-completed cell remains in the state that transmission/reception of packets are possible immediately when receiving information indicating that packet data may be transmitted.

The configuration-completed cell may remain activated or deactivated. Here, the "activation" refers to when data is under transmission or reception or stands ready. The user equipment may monitor or receive the control channel (PDCCH) and the data channel (PDSCH) of the activated cell so as to identify the resources (which may be frequency or time) assigned thereto.

The deactivation refers to when transmission or reception of traffic data is impossible but measurement or transmission or reception of minimum information is possible. The user equipment may receive system information (SI) necessary for receiving packets from the deactivated cell. On the contrary, the user equipment does not monitor or receive the control channel (PDCCH) and the data channel (PDSCH) of the deactivated cell in order to identify resources (which may be frequency or time) assigned thereto.

The cell may be classified into a primary cell, a secondary cell, and a serving cell.

The primary cell refers to a cell that operates at a primary frequency, a cell in which the user equipment performs an initial connection establishment/reestablishment procedure with the base station, or a cell designated as a primary cell during the course of handover. The secondary cell means a cell that operates at a secondary frequency and this cell is configured once RRC connection is established and is used for providing an additional wireless resource.

The serving cell is configured as the primary cell when carrier aggregation (CA) is not configured or when the user equipment cannot provide CA. When CA is configured, the term "serving cell" is used to represent the primary cell, one of all the secondary cells, or an aggregation of a plurality of secondary cells. That is, the primary cell means one serving cell that provides security input and NAS mobility information in the state of RRC establishment or re-establishment. According to capabilities of the user equipment, at least one cell may be configured to form a serving cell aggregation together with the primary cell, and here, the at least one cell is referred to as the secondary cell. Accordingly, the aggregation of serving cells configured for one user equipment may be constituted of a single primary cell only or one primary cell and at least one secondary cell. PCC (Primary Component Carrier) refers to a component carrier (CC) that corresponds to the primary cell. PPC is a CC through which, among other carriers, the user equipment establishes a connection or RRC connection with the base station at early time. The PCC is a special CC that is in charge of connection or RRC connection for signaling regarding a number of CCs and manages UE context information which is connection information relating to the user equipment. Further, the PCC remains activated all the time when establishing a connection with the PCC so that it is in the RRC connected mode.

SCC (Secondary Component Carrier) refers to a CC that corresponds to the secondary cell. That is, the SCC is a CC assigned to the user equipment other than the PCC, and the SCC is an extended carrier for the user equipment to assign an additional resource other than the PCC. The SCC may remain activated or deactivated.

The downlink component carrier corresponding to the primary cell is referred to as a downlink primary component carrier (DL PCC), and an uplink component carrier corresponding to the primary cell is referred to as an uplink primary component carrier (UL PCC). Further, in the downlink, a component carrier corresponding to the secondary cell is referred to as a downlink secondary component carrier (DL SCC), and in the uplink, a component carrier corresponding to the secondary cell is referred to as an uplink secondary component carrier (UL SCC).

The primary cell and the secondary cell have the following characteristics.

First, the primary cell is used for transmitting PUCCH. Second, the primary cell remains activated all the time whereas the secondary cell is a carrier that is activated/deactivated depending on a specific condition. Third, when the primary cell experiences a radio link failure (hereinafter, "RLF"), RRC reconnection is triggered, while when the secondary cell experiences the RLF, RRC reconnection is not triggered. Fourth, the primary cell may be changed by a change in security key or by a handover procedure coming with a RACH (Random Access CHannel) process. Fifth, NAS (Non-Access Stratum) information is received through the primary cell. Sixth, in the primary cell, the DL PCC and the UL PCC always constitute a pair. Seventh, a different component carrier (CC) may be configured as the primary cell for each user equipment. Eighth, procedures, such as reconfiguration, addition, or removal of the primary cell, may be conducted by the RRC layer. When adding a new secondary cell, RRC signaling may be used to transmit system information of a dedicated secondary cell.

The downlink component carrier may be constituted of a single serving cell, and the downlink component carrier and uplink component carrier may be configured to be connected, thereby constituting one serving cell. However, a single uplink component carrier alone fails to constitute a serving cell. Activation/deactivation of a component carrier is equivalent in concept to activation/deactivation of a serving cell. For example, assuming that a serving cell 1 is constituted of DL CC1, activation of the serving cell 1 means activation of DL CC1. When it is assumed that a serving cell 2 is configured so that DC CC2 is connected to UL CC2, activation of the serving cell 2 means activation of DC CC2 and UL CC2. In this sense, each component carrier may correspond to a cell.

The number of component carriers aggregated may differ between the downlink and the uplink. A situation where the number of downlink CCs and the number of uplink CCs are the same is referred to as symmetric aggregation, and a situation where the numbers are different from each other is referred to as asymmetric aggregation. Further, the sizes of CCs (i.e., bandwidth) may differ. For example, when five CCs are used to configure a band of 70 MHz, the configuration of 5 MHz CC (carrier #0)+20 MHz CC (carrier #1)+20 MHz CC (carrier #2)+20 MHz CC (carrier #3)+5 MHz CC (carrier #4) may be made.

As described above, unlike in the single carrier system, in the multi-carrier system, a plurality of component carriers (CC) may be supported. That is, one user equipment may receive a plurality of PDSCHs through a plurality of DL CCs.

The multi-carrier system may support cross-carrier scheduling. The cross-carrier scheduling is a scheduling scheme that may perform resource allocation of PDSCH transmitted via a different component carrier through PDCCH transmitted via a specific component carrier and/or may perform resource allocation of PUSCH transmitted via a component carrier other than a component carrier basically linked to the specific component carrier. That is, the PDCCH and PDSCH may be transmitted through different downlink CCs, and the PUSCH may be transmitted through an uplink CC other than an uplink CC linked to the downlink CC through which the PDCCH including a UL grant is transmitted. As such, a system supporting the cross-carrier scheduling needs an indicator notifying the PDSCH/PUSCH through which the PDCCH provides control information are transmitted through which DL CC/UL CC. The field including such carrier indicator is hereinafter referred to as carrier indication field (CIF).

The multi-carrier system supporting the cross-carrier scheduling may include the carrier indication field (CIF) in the conventional DCI (downlink control information) format. In a system supporting the cross-carrier scheduling, For example, LTE-A system, the CIF is added to the existing DCI format (i.e., DCI format used in LTE), and thus, one to three bits may expand, and the PDCCH structure may reuse the existing coding scheme, and resource allocation scheme (i.e., CCE-based resource mapping).

Figure 8:
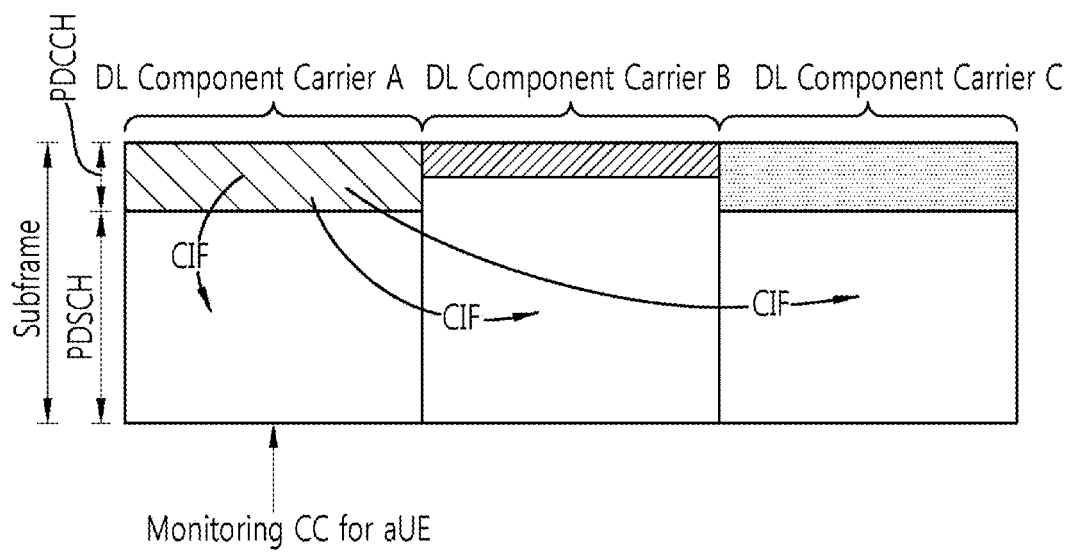
FIG. 8 illustrates an exemplary structure of a subframe for cross carrier scheduling in a multi-carrier system.

FIG. 8 illustrates an exemplary structure of a subframe for cross carrier scheduling in a multi-carrier system.

Referring to FIG. 8, the base station may configure a PDCCH monitoring DL CC aggregation. The PDCCH monitoring DL CC aggregation consists of some of all the DL CCs aggregated, and if cross-carrier scheduling is configured, the user equipment performs PDCCH monitoring/decoding only on the DL CC included in the PDCCH monitoring DL CC aggregation. In other words, the base station transmits the PDCCH for the PDSCH/PUSCH to be scheduled through only the DL CC included in the PDCCH monitoring DL CC aggregation. The PDCCH monitoring DL CC aggregation may be configured UE-specifically, UE group-specifically, or cell-specifically.

Figure 9:
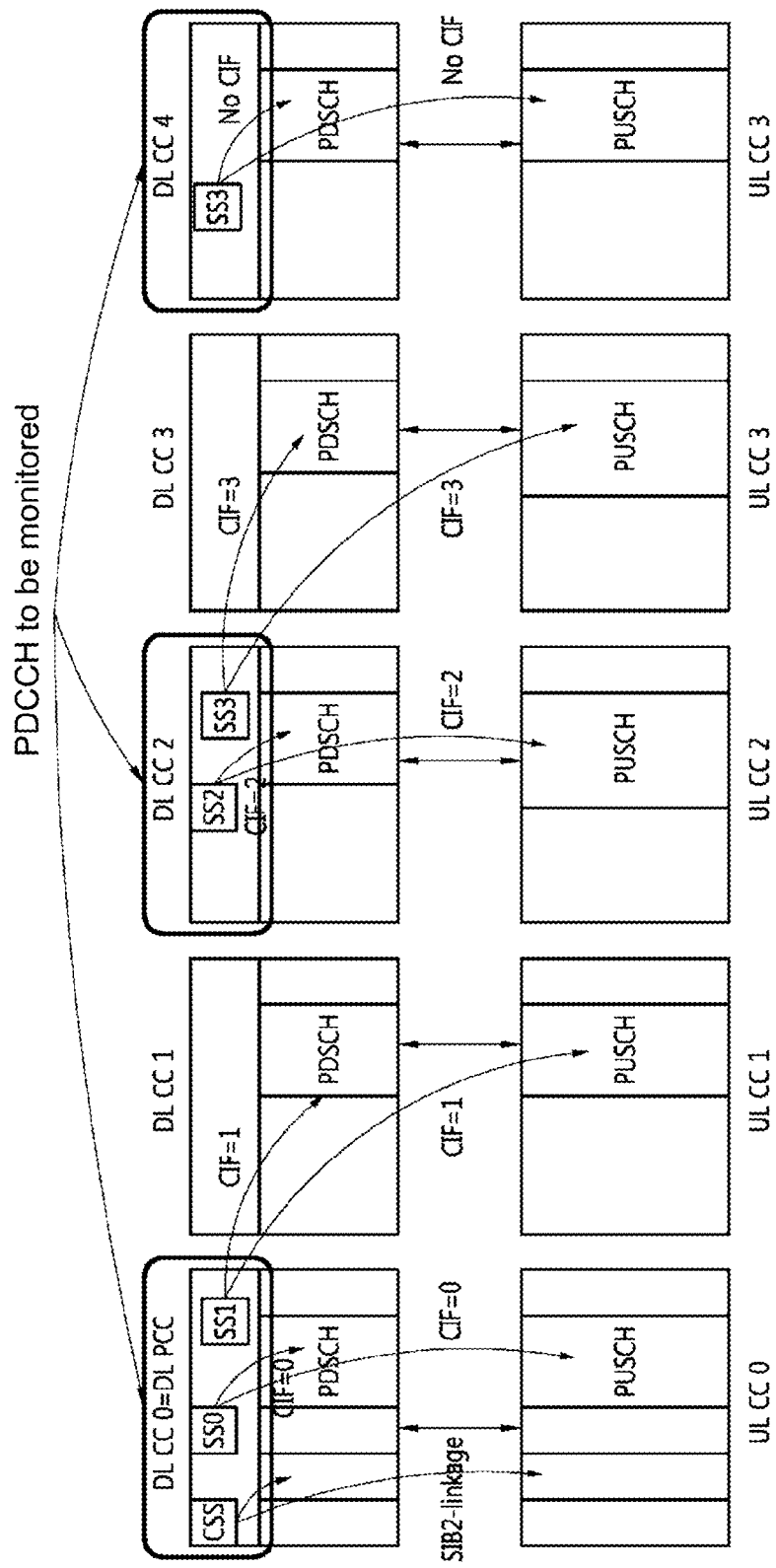
FIG. 9 illustrates a scheduling example if a cross-carrier scheduling is set in a carrier aggregation system.

In FIG. 9, three DL CCs (DL CC A, DL CC B, and DL CC C) are aggregated, and DL CC A is configured as the PDCCH monitoring DL CC, as an example. The user equipment may receive a DL grant for the PDSCH of DL CC A, DL CC B, and DL CC C through PDCCH of DL CC A. DCI transmitted through the PDCCH of DL CC A includes the CIF and thus is able to indicate which DL CC the DCI is for.

The CIF value is the same as the value of the serving cell index. The serving sell index is transmitted to the terminal through the RRC signal. The serving sell index includes values that may used to identify serving cells, namely, a primary cell or a secondary cell. For example, 0 value may express the primary cell.

FIG. 9 illustrates a scheduling example if a cross-carrier scheduling is set in a carrier aggregation system.

Referring to FIG. 9, DL CC 0, DL CC 2 and DL CC 4 are a PDCCH monitoring DL CC set. The terminal searches DL grant/UL grant for the DL CC 0 and the UL CC 0(UL CC linked to SIB 2 with the DL CC 0) in the CSS of the DL CC 0. In addition, the terminal searches the DL grant/UL grant for the DL CC 1 and the UL CC 1 in the SS 1 of the DL CC 0. The SS 1 is an example of USS. That is, the SS 1 of the DL CC 0 is a search space for searching the DL grant/UL grant to perform the cross carrier scheduling.

Meanwhile, the carrier aggregation (CA) technique may be largely divided into the inter-band CA and intra-band CA techniques as described above. The inter-band CA is a method that uses an aggregated CC by aggregating each CC existing in the different bands, and the intra-band CA is a method that uses an aggregated CC by aggregating each CC in the same bands. In addition, the CA technique may be again divided into Intra-Band Contiguous CA, Intra-Band Non-Contiguous CA and Inter-Band Non-Contiguous CA, in more detail.

Figure 10:
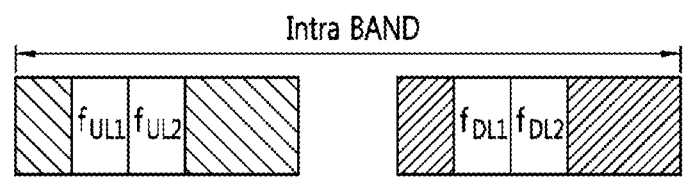
FIG. 10 shows the concept of intra-band CA.
Figure 10:
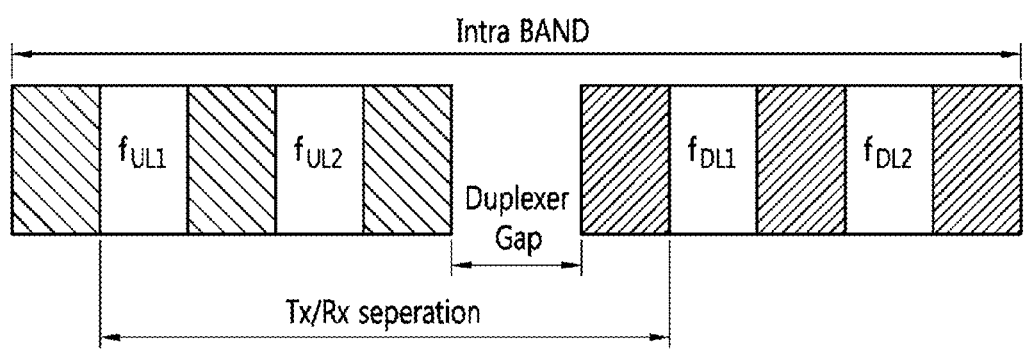

FIG. 10 shows the concept of intra-band CA.

FIG. 10(a) shows intra-band contiguous CA, and FIG. 10(b) shows intra-band non-contiguous CA.

The CA discussed in LTE-Advanced can be divided into the intra-band contiguous CA shown in FIG. 10(a) and the intra-band non-contiguous CA shown in FIG. 10(b).

Figure 11:
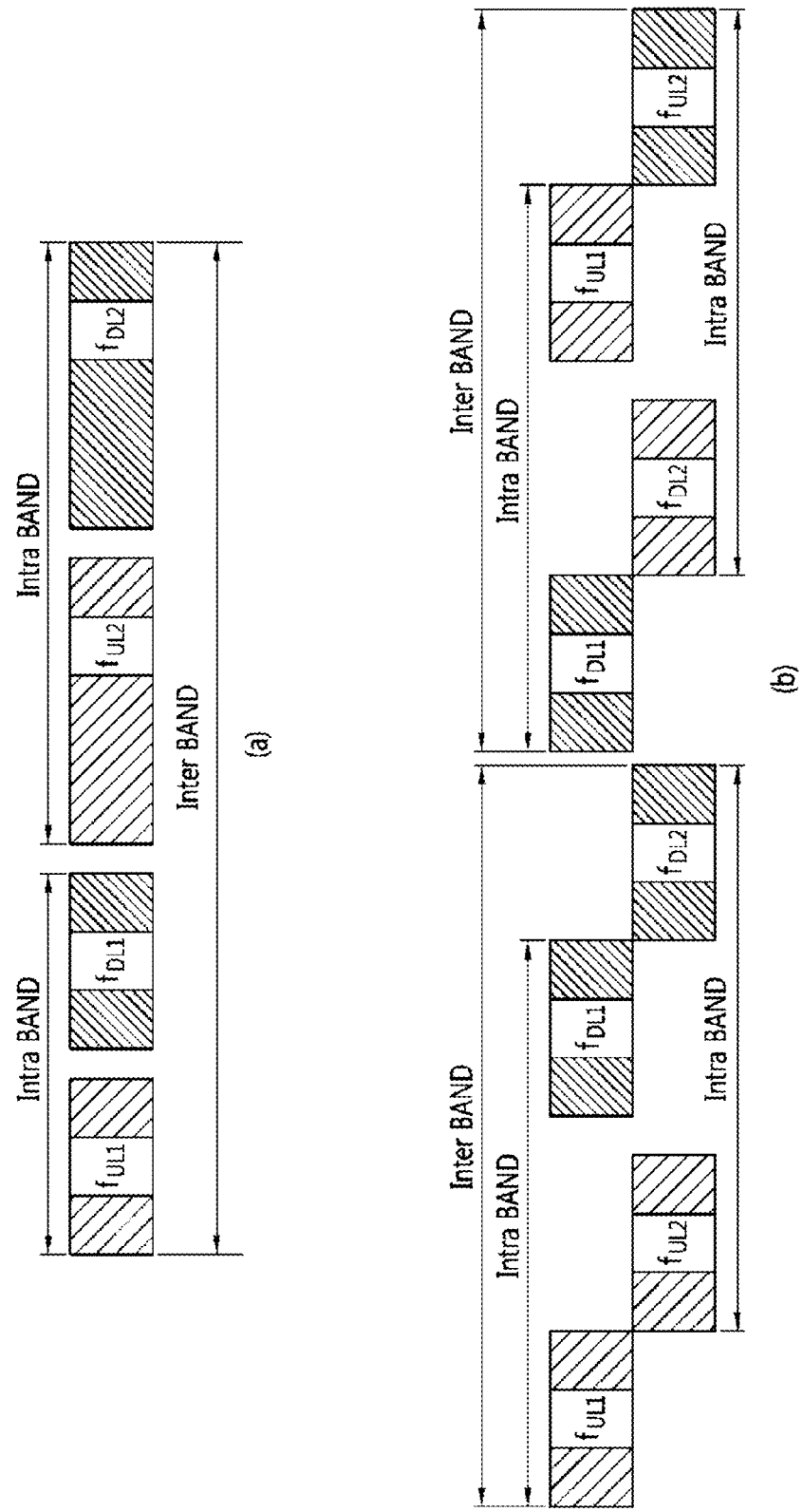
FIG. 11 shows the concept of inter-band CA according to an embodiment of the present invention.

FIG. 11 shows the concept of inter-band CA according to an embodiment of the present invention.

FIG. 11(a) shows a combination of a low band and a high band for the inter-band CA, and FIG. 11(b) shows a combination of similar frequency bands for the inter-band CA.

That is, the inter-band CA of FIG. 11 can be divided into inter-band CA between carriers of a low-band and a high-band when RF characteristics of the inter-band CA are different from each other as shown in FIG. 11(a) and inter-band CA of a similar frequency capable of using a common RF node for each component carrier since RF characteristics are similar as shown in FIG. 11(b).

TABLE 2

| E-UTRA Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, in the 3GPP LTE system, operating bands for uplink and downlink as Table 2 above is defined. Four cases of FIG. 10 and FIG. 11 are separated based on Table 2.

Here, $F_{UL\_low}$ means the lowest frequency of the uplink operating band. In addition, $F_{UL\_high}$ means the highest frequency of the uplink operating band. Also, $F_{DL\_low}$ means the lowest frequency of the downlink operating band. In addition, $F_{DL\_high}$ means the lowest frequency of the uplink operating band.

When the operating band has been defined as Table 2. Frequency distribution organizations in each country can assign specific frequencies to service providers according to situation of each country.

Meanwhile, CA band classes and corresponding guard band are shown in Table 3 below.

TABLE 3

| Bandwidth Class | Aggregated Transmission Bandwidth Configuration) | Maximum number of CC | Nominal Guard) Band $BW_{GB}$ |
|---|---|---|---|
| A | $N_{RB,agg} \leq 100$ | 1 | $0.05 BW_{Channel(1)}$ |
| B | $N_{RB,agg} \leq 100$ | 2 | FFS |
| C | $100 < N_{RB,agg} \leq 200$ | 2 | $0.05$ $max(BW_{Channel(1)}, BW_{Channel(2)})$ |
| D | $200 < N_{RB,agg} \leq [300]$ | FFS | FFS |
| E | $[300] < N_{RB,agg} \leq [400]$ | FFS | FFS |
| F | $400 < N_{RB,agg} \leq [500]$ | FFS | FFS |

In the table above, the brackets [ ] has not been clearly determined, and indicates that it may be changed. The FFS makes shorter as For Further Study. The $N_{RB\_agg}$ is the number of aggregated RBs within the aggregation channel band.

Table 4 below represents a set of bandwidth corresponding to each CA Configuration.

TABLE 4

E-UTRA CA configuration/Bandwidth combination set

| E-UTRA CA configuration | 50RB + 100RB (10 MHz + 20 MHz) | 75RB + 75RB (15 MHz + 15 MHz) | 75RB + 100RB (15 MHz + 20 MHz) | 100RB + 100RB (20 MHz + 20 MHz) | Maximum aggregated bandwidth [MHz] | Bandwidth Combination Set |
|---|---|---|---|---|---|---|
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In above table, the CA configuration represents the operating band and the CA bandwidth. For example, the CA_1C means the operating band of Table 2 the CA band class C of Table 3. Bands that do not represent in table above may be applied to all CA operating class.

Figure 12:
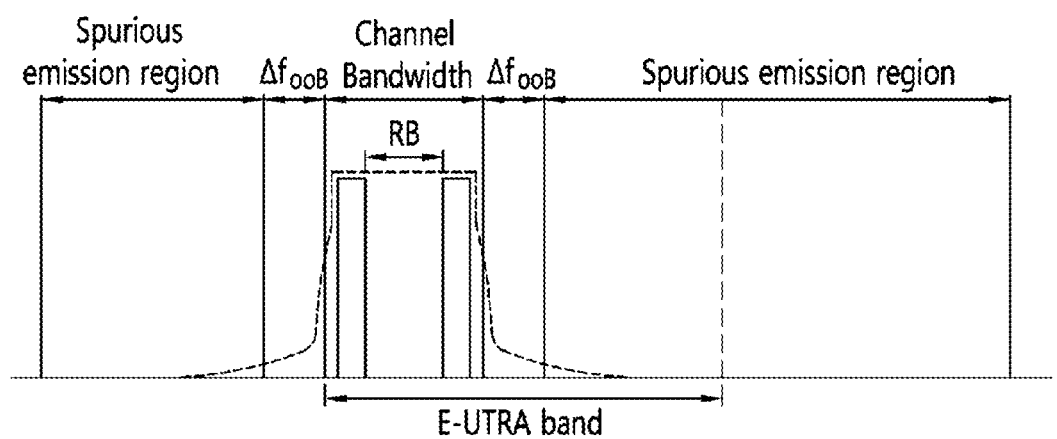
FIG. 12 shows the concept of unwanted emission, FIG. 13 concretely shows emission in an external band of the unwanted emission shown in FIG. 12.
Figure 13:
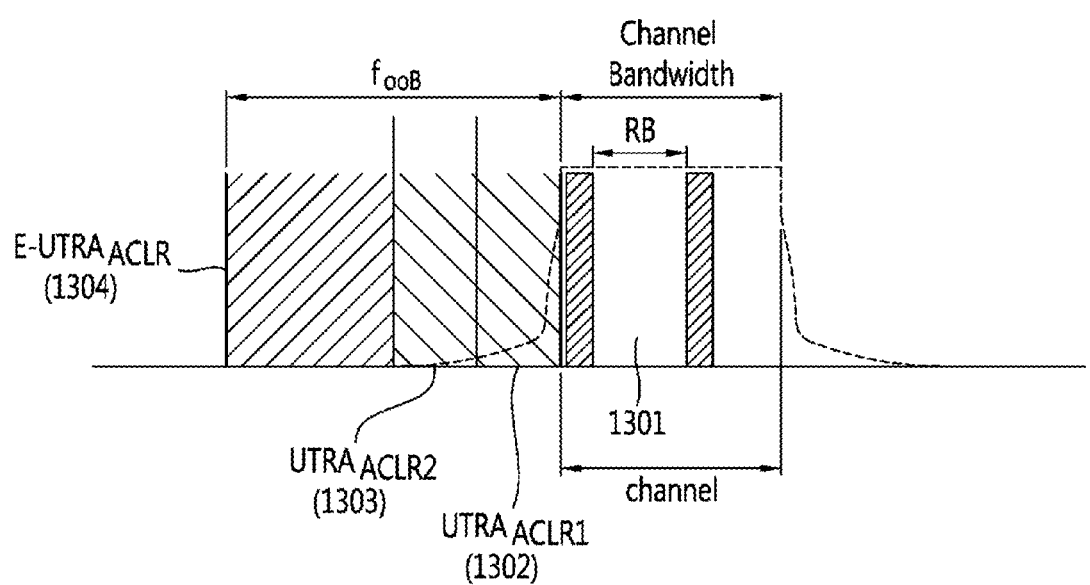
Figure 14:
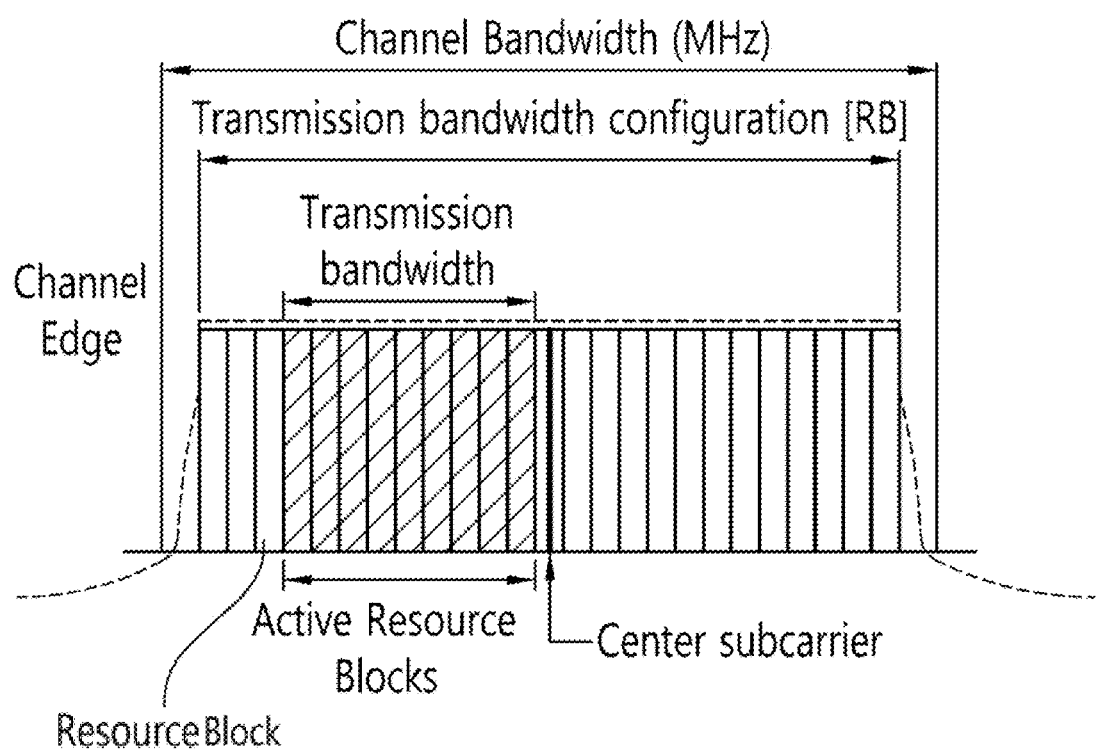
FIG. 14 shows a relationship between a resource block (RB) and a channel band (MHz) shown in FIG. 12.

FIG. 12 shows an unwanted emission, FIG. 13 concretely shows emission in an external band of the unwanted emission shown in FIG. 12, and FIG. 14 shows a relationship between a resource block (RB) and a channel band (MHz) shown in FIG. 12.

As can be seen in FIG. 12, any transmitter transmits signals on the channel bandwidth assigned within any E-UTRA bands.

Here, the channel bandwidth may be defined as can be seen in FIG. 14. In other words, a transmission bandwidth configuration may be made smaller than the channel bandwidth ($BW_{Channel}$). The transmission bandwidth configuration may be made by a plurality of resource blocks (RBs). In addition, an channel edge may be the highest and lowest frequencies separated by the channel bandwidth.

Meanwhile, in the 3GPP LTE system as described above, 1.4 MHz, 3 MHz, 5 MHz, 10 MHz, 15 MHz and 20 MHz may be supported as the channel bandwidth. The relationship between this channel bandwidth and the number of resource blocks is shown in Table 5 below.

TABLE 5

| channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Referring again to FIG. 12, the unwanted emission occurs in bands of $\Delta f_{OOB}$. In addition, as shown in FIG. 12, the unwanted emission occurs even on a spurious area. Here, the $\Delta f_{OOB}$ means the size of the frequency of the Out Of Band (OOB). Meanwhile, the emission on the OOB means that it generates in bands adjacent to the intended transmission bands. The spurious emission means that the unwanted waves are emitted to frequency bands away from the intended transmission bands.

Meanwhile, the 3GPP release 10 has defined a basic spurious emission (SE) that does not exceed the minimum depending on the frequency range.

On the other hand, as shown in FIG. 13, if the transmission is performed in the E-UTRA channel band 1301, the leakage occurs in the OOBs (1302, 1303 and 1304 in shown the $f_{OOB}$ area), that the unwanted emission occurs.

Here, when the terminal performs a transmission on the E-UTRA channel 1301, $UTRA_{ACLR1}$ is a ratio leaked to the UTRA channel, i.e., the adjacent channel 1302, that is, a channel leakage ratio, if the immediately adjacent channel 1302 is for the UTRA. In addition, the $UTRA_{ACLR2}$ is a ratio leaked to the adjacent channel 1303, i.e., UTRA channel, i.e., that is, an adjacent channel leakage ratio, if the channel 1303 located next to the adjacent channel 1302 is for the UTRA, as shown in FIG. 13. In addition, the $E\text{-}UTRA_{ACLR}$ is a ratio leaked to the adjacent channel 1304, i.e., UTRA channel, i.e., that is, an adjacent channel leakage ratio, when the terminal transmits from the E-UTRA channel 1301.

As described above, if the transmission is performed on the assigned channel band, the unwanted emission occurs to the adjacent channels.

Here, the interference caused by transmission of the base station can be reduced to less than the criterion that allows the amount of the interference to be input into the adjacent band according to the RF filter design of the expensive and large size due to the nature of the base station. Meanwhile, in the case of the terminal, the interference to be input into the adjacent band is difficult to avoid completely due to limitation of the size of the terminal and limitation of the cost of the power amplifier or pre-duplex filter elements.

Thus, the limitation of transmission power of the terminal is required.

Figure 15:
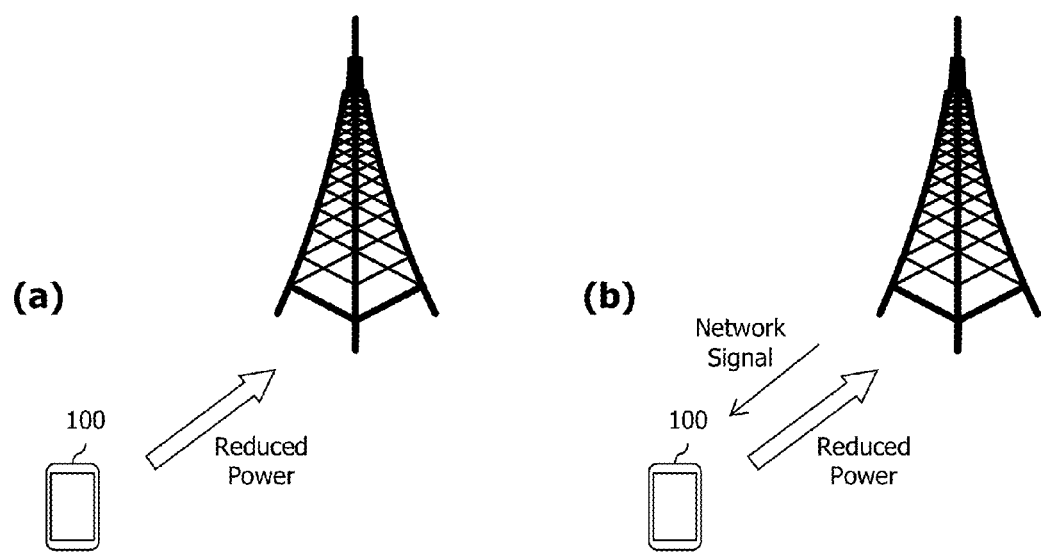
FIG. 15 illustrates an example of a method for limiting transmission power of a terminal.

FIG. 15 illustrates an example of a method for limiting transmission power of a terminal.

As can be seen in FIG. 15(a), the terminal 100 performs transmission by limiting the transmission power.

If the peak-to-average power ratio (PAPR) is high, the linearity of the power amplifier (PA) degrades accordingly. Accordingly, in order to maintain this linearity, the value of the maximum power reduction (MPR) to limit the transmission power may be a maximum of 2 dB according to the modulation methods.

This is shown in Table 6 below.

TABLE 6

| Modulation | Channel bandwidth/Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 6 above represents values of MPR for the power classes 1 and 3.

<MPR According to 3GPP Release 11>

Meanwhile, the terminal according to the 3GPP release 11 adopts multi-clustered transmission in a single component carrier (CC) and transmit the PUSCH and the PUCCH at the same time. As such, if the PUSCH and the PUCCH are simultaneously transmitted, the size of the IM3 component (means distortion signals generated due to inter-modulation) generated in the OOB area is greater than the size of the existing. Accordingly, since the larger interference is applied in the adjacent band, the terminal can set the MPR value as below such that a general spurious emission, an adjacent channel leakage ratio (ACLR) and a general Spectrum Emission Mask (SEM) are satisfied which are emission requirements of the terminal to be transmitted in the uplink by the terminal.

MPR=CEIL{$M_A$,0.5}     [Equation 1]

Where, $M_A$ is as follows:

$M_A$=[8.0]-[10.12]A; 0<A≤[0.33]

[5.67]-[3.07]A; [0.33]<A≤[0.77]

[3.31]; [0.77]<A≤[1.0]

Where, A is as follows:

A=$N_{RB\_alloc}$/$N_{RB}$.

The $N_{RB\_agg}$ is the number of RBs in the channel band, and the $N_{RB\_alloc}$ represents the total number of the RBs to be transmitted at the same time.

The CEIL{$M_A$, 0.5} means a function that rounds off in 0.5 dB unit. That is, MPRϵ[3.0, 3.5 4.0 4.5 5.0 5.5 6.0 6.5 7.0 7.5 8.0].

The MPR value shown in Equation 1 is a MPR value applied when using the general power amplifier (PA). If high-efficiency PA in a recent study is used, the MPR value of the larger level may be necessary.

<MPR According to CA>

On the other hand, considering the CA, the channel bandwidth of the uplink may be increased to the maximum of 40 MHz (20 MHz+20 MHz) and accordingly, there is a need for the larger MPR value.

TABLE 6

| Modulation | CA bandwidth Class C | | | | MPR (dB) |
|---|---|---|---|---|---|
| | 50 RB +100 RB | 75 RB + 75 RB | 75 RB + 100 RB | 100 RB + 100 RB | |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤ 18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

Table 6 above represents the MPR value for the power class 3.

In a case of the class C of intra continuous CA as shown in Table 6, the maximum MPR value of 3 dB can be applied according to the modulation scheme. Meanwhile, when considering multi-cluster transmission under the CA class C environment, the MPR value should be satisfied as follows:

MPR=CEIL{$M_A$,0.5}     [Equation 2]

Where, $M_A$ is as follows:

MA=8.2; 0≤A≤0.025

9.2-40 A; 0.025≤A≤0.05

8-16 A; 0.05≤A≤0.25

4.83-3.33 A; 0.25≤A≤0.4, 3.83-0.83 A; 0.4≤A≤1,

<A-MPR according to LTE>

As can be seen in shown in FIG. 15(b), in order to apply an additional maximum power reduction (A-MPR), the base station can transmit the network signal (NS) to the terminal (100).

By transmitting the network signal (NS) to the terminal 100 operating in a specific operating band, the base station can instruct the terminal 100 to further reduce the power, in order to avoid interference to the adjacent bands unlike the above-mentioned MPR. In other words, when the terminal applying the MPR receives the network signal NS, the terminal determines the transmission power by further applying the A-MPR.

Figure 16:
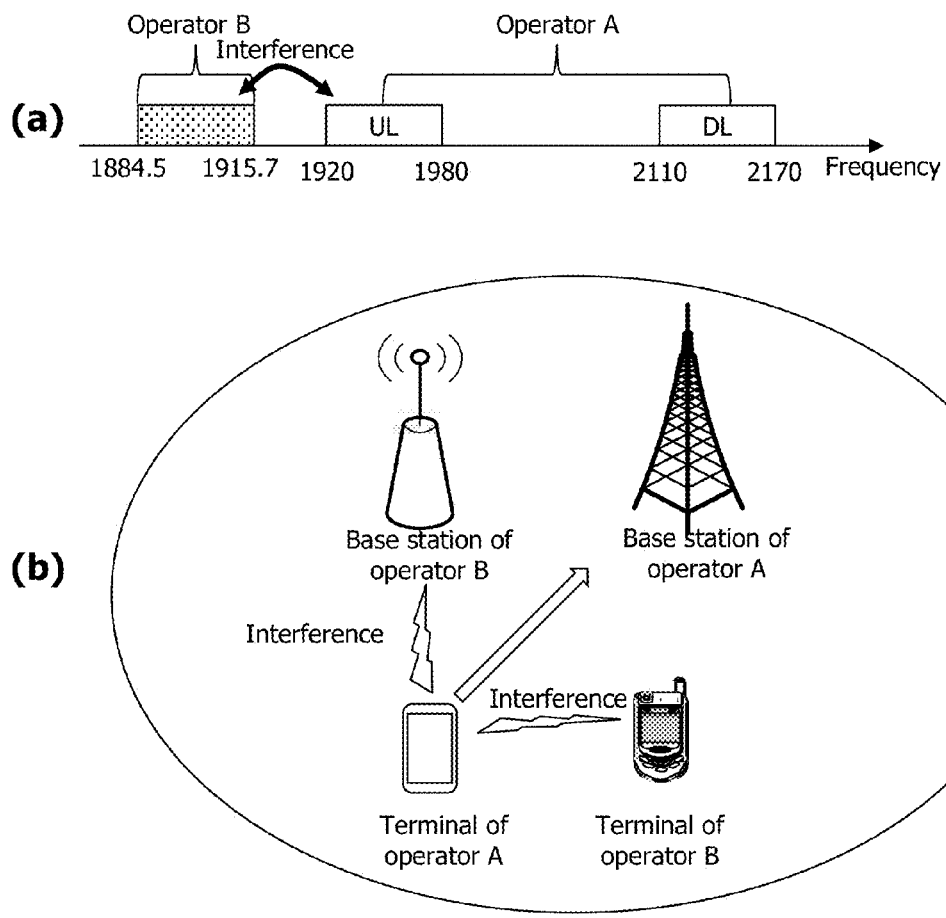
FIG. 16 illustrates an example generating interference when any provider uses a band adjacent to a band of another provider.

FIG. 16 illustrates an example generating an interference when any provider uses an band adjacent to a band of another operator.

As can be seen in FIG. 16(a), let's assumed that while the operator A provides a service using the uplink assigned as 1920 MHz~1980 MHz, and the downlink assigned as 2110 MHz~2170 MHz in the operating band 1 shown in Table 2, the operator B provides a service using the 1884.5 MHz to 1915.7 MHz. The band of 1884.5 MHz to 1915.7 MHz is used in Japan for a personal handy-phone system (PHS).

In even such circumstance, as shown in FIG. 16(b), in a case where the operator A and the operator B being serviced in a specific area at the same time, if the terminal of the operator A performs the transmission to the base station through the uplink band, that is, 1920 MHz to 1980 MHz bands, the spurious emission occurs and accordingly, the bands of the operator B, that is, 1884.5 MHz to 1915.7 MHz is interfered. As such, the unwanted emission occurs to the bands adjacent to each other.

Therefore, in order that the amount of interference caused by the spurious emission of the terminal does not exceed an allowable value, the method to limit the transmission power of the terminal or the allocation number of transmission resource blocks is required. However, simply reducing the transmission power causes reducing the service coverage. Accordingly, it is required to reduce the transmission power at an appropriate level.

Now, according to one embodiment of the present invention, the transmission power control method will be described based on the results of the experiment.

FIG. 17a through FIG. 19c show simulation results according to an embodiment of the present invention.

In the experiment, in order to protect the band for the PHS and the adjacent band 34 by the terminal that being operated in the Band 1 shown in Table 2, when the CA_NS_01 is come down, how the A-MPR values may be needed is simulated.

The required A-MPR levels for multi-clustered simultaneous transmission for CA_1C to protect Band 34 and PHS band are simulated according to the number of allocated RB and started RB position of uplink of operating bands. From the simulation, there are provided the required A-MPR values for 16QAM based on the RB start position and the number of contiguous RB allocation. The required A-MPR masks are determined meeting Tx requirements such as ACLR, additional SEM and additional SE. The basic RF simulation assumptions and parameters are given below;

Basic simulation assumption and parameters are as follows:

A. Channel Combination for CA_1C

20 MHz (100 RBs)+20 MHz (100 RBs): Center frequency: 1960 MHz

15 MHz (75 RBs)+15 MHz (75 RBs): Center frequency: 1955 MHz

B. Modulator Impairments

I/Q imbalance: 25 dBc

Carrier leakage: 25 dBc

Counter IM3: 60 dBc

C. ACLR Requirement

The ACLR requirements are exemplary shown in below table.

TABLE 7

| Channel arrangement | Minimum channel spacing with 1 MHz Guard band |
|---|---|
| $UTRA_{ACLR1}$ Adjacent channel center frequency offset (in MHz) | 33 dB +10 + $BW_{UTRA}/2$ or −10 − $BW_{UTRA}/2$ |
| $UTRA_{ACLR2}$ Adjacent channel center frequency offset (in MHz) | 36 dB +10 + 3*$BW_{UTRA}/2$ or −10 −3* $BW_{UTRA}/2$ |
| UTRA 5 MHz channel[1] Measurement bandwidth | 3.84 MHz |
| $E-UTRA_{ACLR}$ Adjacent channel center frequency offset (in MHz) | 30 dB +20 or −20/+15 or −15 |
| E-UTRA channel Measurement bandwidth | /13.5 MHz |

D. General SEM Requirement for Nominal Bandwidth of 39.8 MHz

The general SEM requirement for nominal bandwidth of 39.8 MHz is exemplary shown in below table.

TABLE 8

Spectrum emission limit [dBm]/$BW_{Channel\_CA}$

| $\Delta f_{OOB}$ (MHz) | 29.9 MHz | 30 MHz | 34.85 MHz | 39.8 MHz | Measurement bandwidth |
|---|---|---|---|---|---|
| ±0-1 | −22.5 | −22.5 | −23.5 | −24 | 30 kHz |
| ±1-5 | −10 | −10 | −10 | −10 | 1 MHz |
| ±5-29.9 | −13 | −13 | −13 | −13 | 1 MHz |
| ±29.9-30 | −25 | −13 | −13 | −13 | 1 MHz |
| ±30-34.85 | −25 | −25 | −13 | −13 | 1 MHz |
| ±34.85-34.9 | −25 | −25 | −25 | −13 | 1 MHz |
| ±34.9-35 | | −25 | −25 | −13 | 1 MHz |
| ±35-39.8 | | | −25 | −13 | 1 MHz |
| ±39.8-39.85 | | | −25 | −25 | 1 MHz |
| ±39.85-44.8 | | | | −25 | 1 MHz |

E. General Spurious Emission Requirement

The general Spurious Emission requirement is exemplary shown in below table.

TABLE 9

| Frequency Range | Maximum Level | Measurement Bandwidth |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

PA operating point: Pout=21 dBm when full RBs allocated in 3GPP release 8 100 RB 16QAM To verify the required A-MPR values for terminal to terminal coexistence requirement in the tables below, RF simulation was performed according to the RB started position and number of contiguous RB.

The simulation parameters are below as

A. Additional Spurious Emissions.

For Band 34: SE level for terminal to terminal coexistence (−50+15−2=−37 dBm/MHz)

Duplexer attenuation: 15 dB

Duplexer insertion loss: 2 dB

For PHS band: SE level for terminal to terminal coexistence (−41+2−2=−41 dBm/300 kHz)

Duplexer attenuation: 2 dB

Duplexer insertion loss: 2 dB

Table 10 and 11 show the additional SE requirements to meet the terminal to terminal coexistence environments. In more detail, table 10 shows SE band of terminal to terminal coexistence and table 11 shows an additional SE requirements (PHS) for CA_NS_01.

TABLE 10

Spurious emission

| E-UTRA CA Configuration | Protected band | Frequency range (MHz) | Maximum Level (dBm) | MBW (MHz) |
|---|---|---|---|---|
| CA_1C | E-UTRA Band 1, 3, 7, 8, 9, 11, 20, 21, 22, 38, 40, 42, 43 | $F_{DL\_low}$-$F_{DL\_high}$ | −50 | 1 |
| | E-UTRA band 33 | $F_{DL\_low}$-$F_{DL\_high}$ | −50 | 1 |
| | E-UTRA band 34 | $F_{DL\_low}$-$F_{DL\_high}$ | −50 | 1 |
| | E-UTRA band 39 | $F_{DL\_low}$-$F_{DL\_high}$ | −50 | 1 |
| | Frequency range for PHS | 1884.5-1915.7 | −41 | 0.3 |
| CA_40C | E-UTRA Band 1, 3, 33, 34, 39, 42, 43 | $F_{DL\_low}$-$F_{DL\_high}$ | −50 | 1 |

$F_{DL\_low}$ and $F_{DL\_high}$ refer to each E-UTRA frequency band specified in Table 2

TABLE 11

| Protected band | Frequency range (MHz) | Maximum Level (dBm) | MBW (MHz) |
|---|---|---|---|
| E-UTRA band 34 | $F_{DL\_low}$-$F_{DL\_high}$ | −50 | 1 |
| Frequency range | 1884.5-1915.7 | −41 | 0.3 |

For measurement conditions at the edge of each frequency range, the lowest frequency of the measurement position in each frequency range should be set at the lowest boundary of the frequency range plus MBW/2. The highest frequency of the measurement position in each frequency range should be set at the highest boundary of the frequency range minus MBW/2. MBW denotes the measurement bandwidth (300 kHz).

Figure 17A:
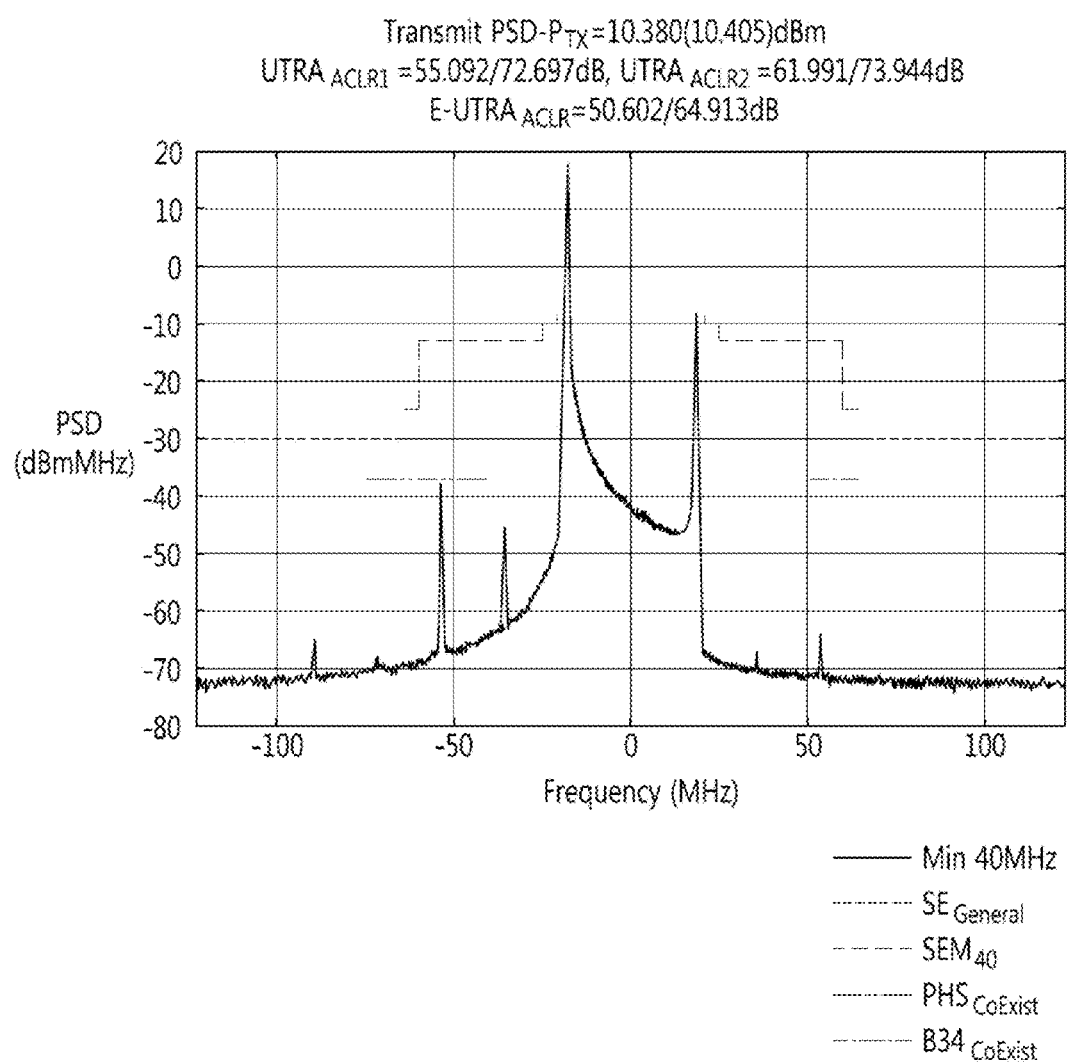
FIG. 17a through FIG. 19c show simulation results according to an embodiment of the present invention.
Figure 17B:
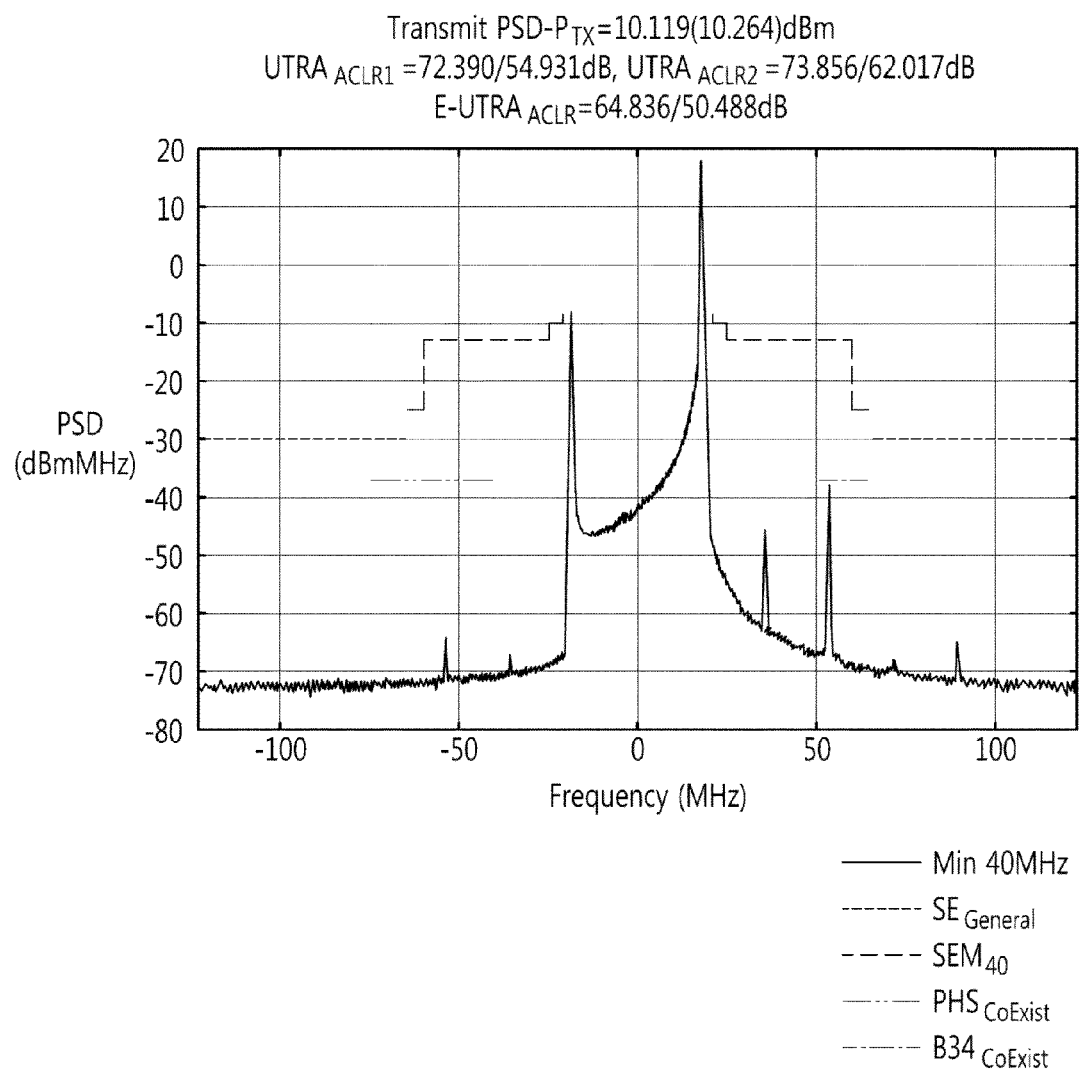

From the RF simulation, the A-MPR mask is evaluated to meet the band specific SE and/or terminal to terminal coexistence. FIG. 17 is the RF simulation results for required A-MPR values for 2×20 MHz intra-contiguous CA_1C with 16QAM to protect PHS band and Band34 when 1 RB is allocated in the nearest edge of the PHS Band or B34. From the simulation results, it is shown that the maximum required A-MPR value is about 11 dB (22−10.38=11.62) to satisfy the PHS and B34 coexistence requirements.

Figure 18A:
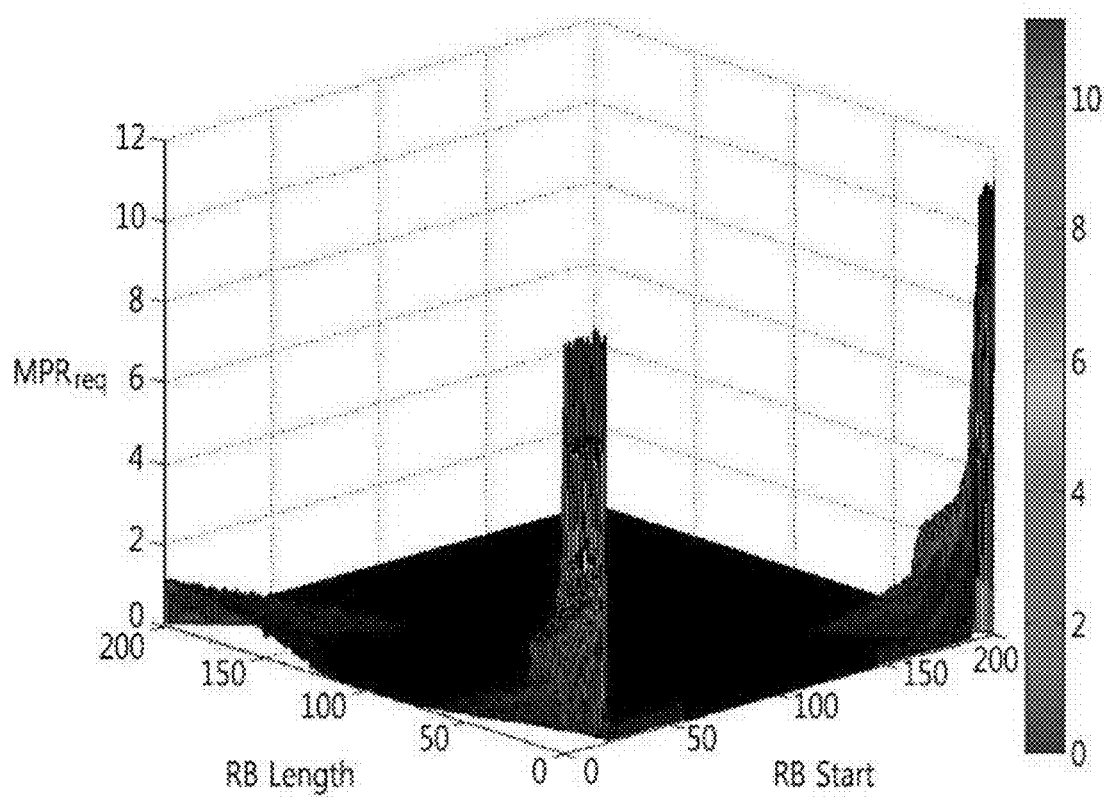
Figure 18B:
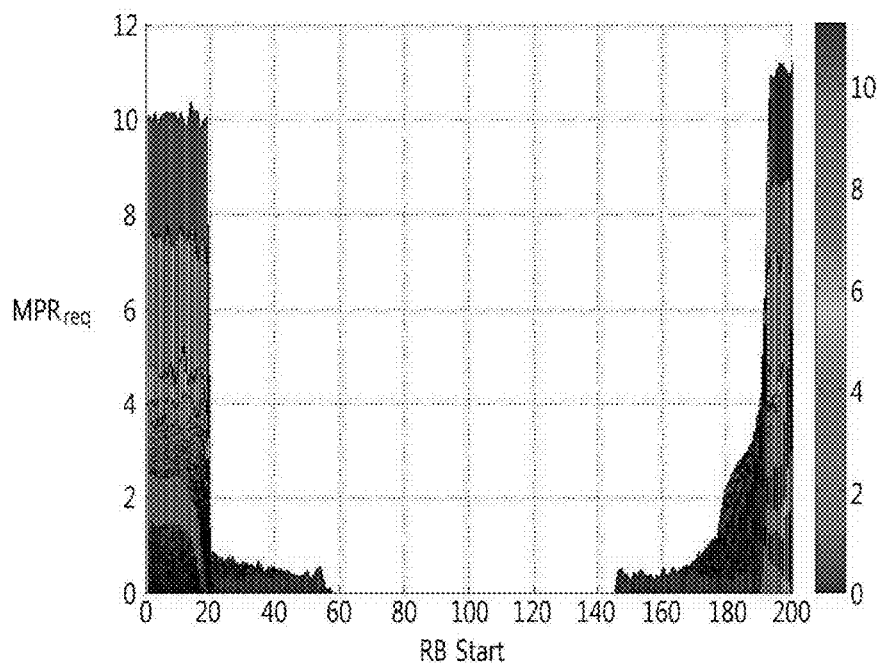
Figure 18C:
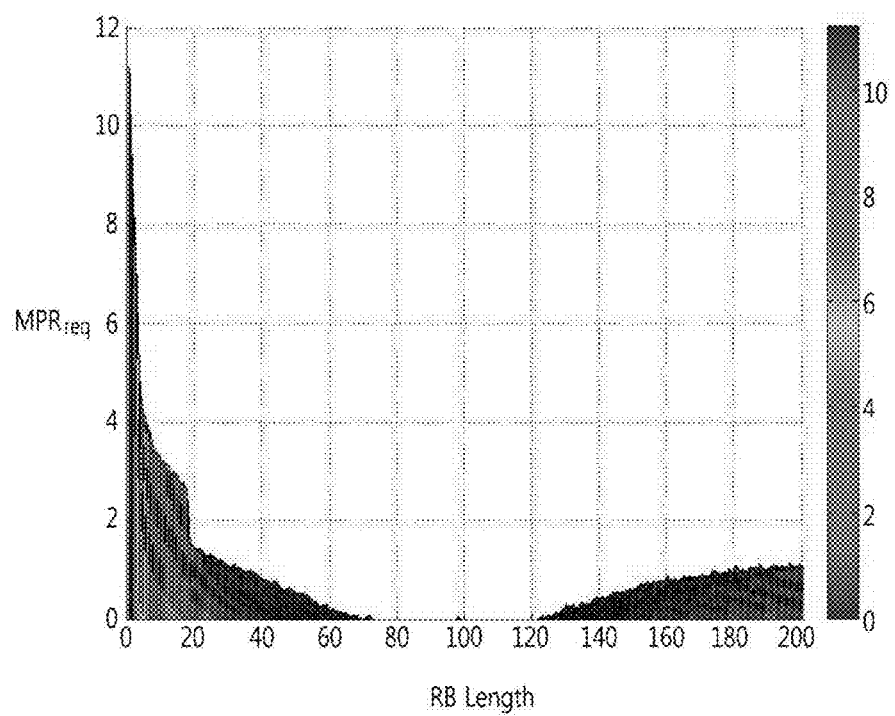

FIG. 18 shows the RF simulation results for requires A-MPR values for 2×20 MHz intra-contiguous CA_1C with 16QAM to protect PHS band and Band34.

FIG. 18 illustrates required A-MPR values for several ten thousand simulations as a three-dimensional graph according to the RB position and the number of the RB from the 1 RB+1 RB configurations to 100 RBs+100 RBs configurations, where the X-axis represents the value for the RB start position, the Y-axis represents the allocated number of RBs, and the Z-axis represents the A-MPR value accordingly. In more detail, FIG. 18 shows simulation results for required A-MPR values for multi-clustered simultaneous transmission of 2×20 MHz CA_1C in 16-QAM modulation.

Figure 19A:
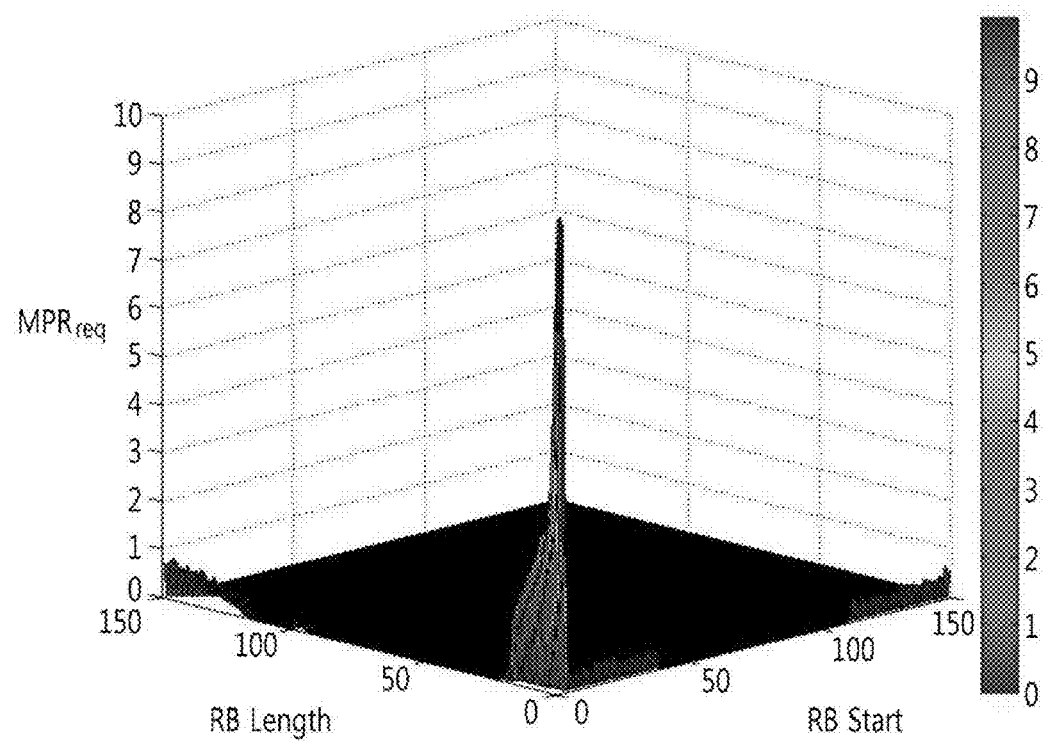
Figure 19B:
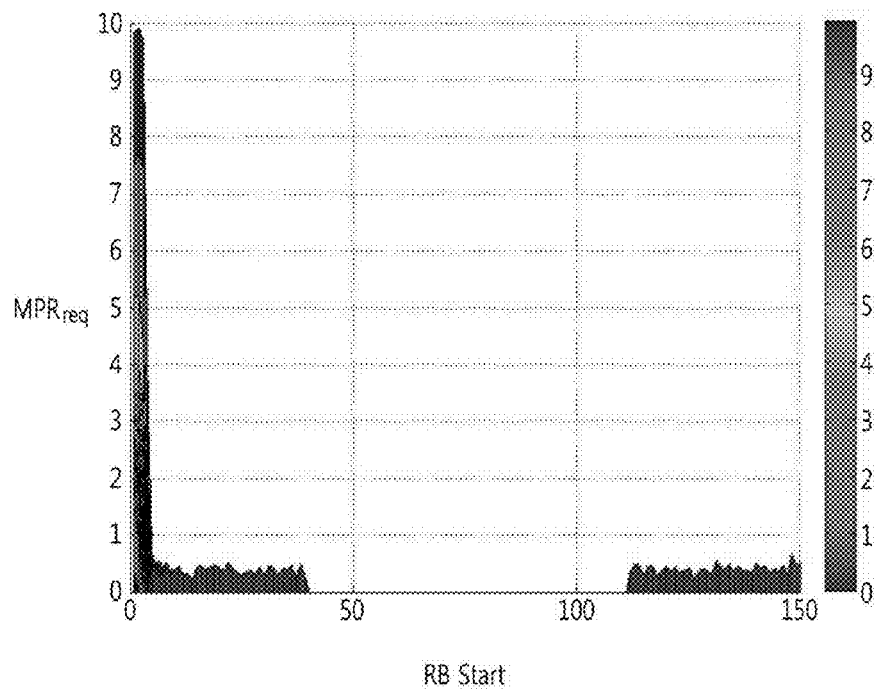
Figure 19C:
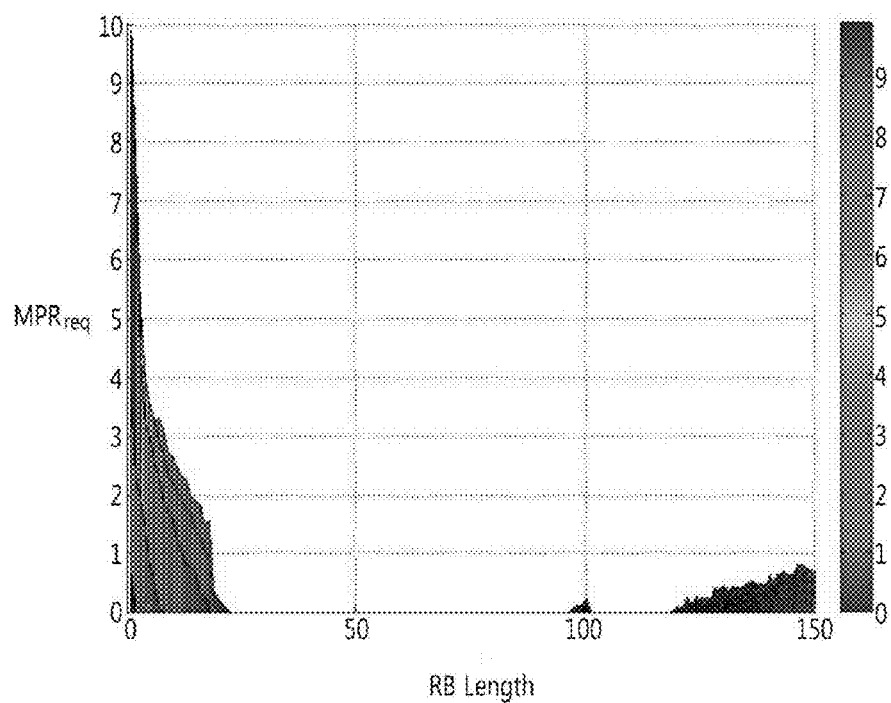

FIG. 19 shows simulation results for required A-MPR values for multi-clustered simultaneous transmission of 2×15 MHz CA_1C in 16-QAM modulation From the analyzed simulation results, the A-MPR values can be summered as such below table to satisfy both PHS band and Band 34 terminal to terminal coexistence requirement for CA_1C.

TABLE 12

| CA_1C | $RB_{Start}$ | $L_{CRB}$ [RBs] | $RB_{start}$ + $L_{CRB}$ [RBs] | A-MPR for QPSK and 16-QAM[dB] |
|---|---|---|---|---|
| 100 RB/ 100 RB | [0]-[20] & [190]-[199] | >[0] | n/a | ≤[11.5] dB |
| | [21]-[158] | >[145] | n/a | ≤[3.0] dB |
| | [159]-[189] | n/a | >[190] | ≤[4.0] dB |
| 75 RB/ 75 RB | [0]-[12] | [0] < $L_{CRB}$ ≤ [10] | n/a | ≤[10.0] dB |
| | | >[10] | n/a | ≤[5.0] dB |
| | [13]-[40] & [111]-[149] | [1] | n/a | ≤[3] dB |
| | [41]-[110] | n/a | >[150] | ≤[2] dB |

$RB_{\_start}$ indicates the lowest RB index of transmitted resource blocks. $L_{\_CRB}$ is the length of a contiguous resource block allocation Alternatively, from the analyzed simulation results, the A-MPR values also can be summered as such below table to satisfy both PHS band and Band 34 terminal to terminal coexistence requirement for CA_1C.

TABLE 13

| CA_1C | $RB_{Start}$ | $L_{CRB}$ [RBs] | $RB_{start}$ + $L_{CRB}$ [RBs] | A-MPR for QPSK and 16-QAM [dB] |
|---|---|---|---|---|
| 100 RB / 100RB | 0-23 & 176-199 | >0 | n/a | ≤12.0 |
| | 24-105 | >64 | n/a | ≤6.0 |
| | 106-175 | n/a | >175 | ≤5.0 |
| 75 RB/ 75 RB | 0-6 & 143-149 | 0 < L_CRB ≤ 10 | n/a | ≤11.0 |
| | | >10 | n/a | ≤6.0 |
| | 7-90 | >44 | n/a | ≤5.0 |
| | 91-142 | n/a | >142 | ≤2.0 |

If the UE is configured to CA_1C and it receives IE CA_NS_01 the allowed maximum output power reduction applied to transmissions on the PCell and the SCell due to multi-cluster transmission is defined as follows

A-MPR=CEIL{MA,0.5}

Where $M_A$ is defined as follows $$MA = -26.66A + 17, \quad 0 \le A < 0.15$$
$$= -8.24A + 14.24, \quad 0.15 \le A \le 1]$$

All values proposed in the table above are the inferred values by means of the results of the simulation above and the specific values may be an example. In addition, in the required A-MPR values, the RB position and the number of RBs proposed in the graph above, the flexibility exists within the range of some error.

Until now, in order to protect the PHS band and band 34, the required A-MPR values are explained based on the results of the experiment by means of the simulation.

Hereinafter, the operation will be described.

Figure 20:
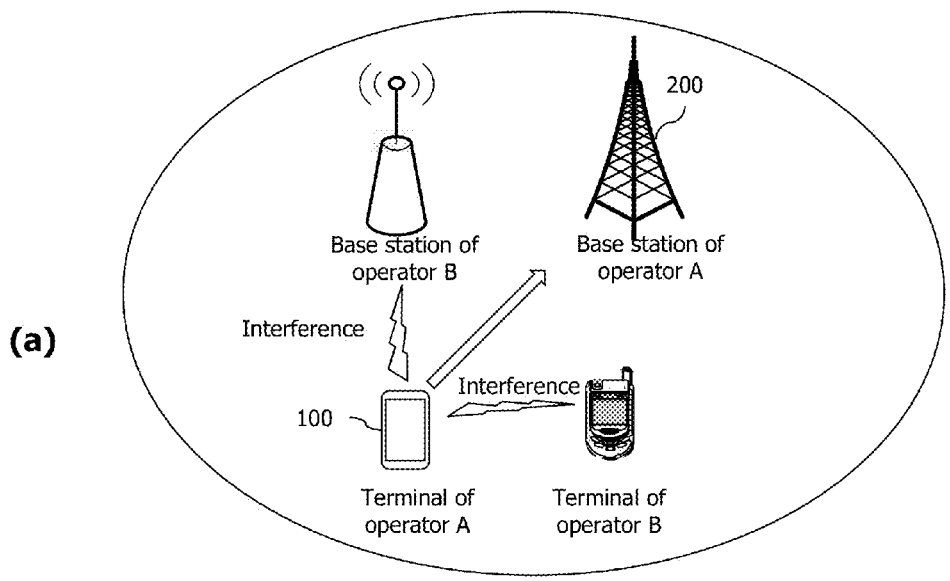
FIG. 20 illustrates a process of transferring system information.
Figure 20:
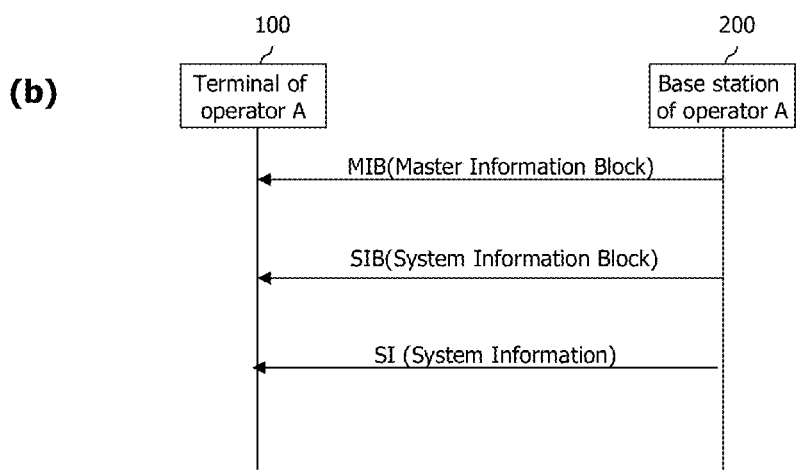
Figure 20:
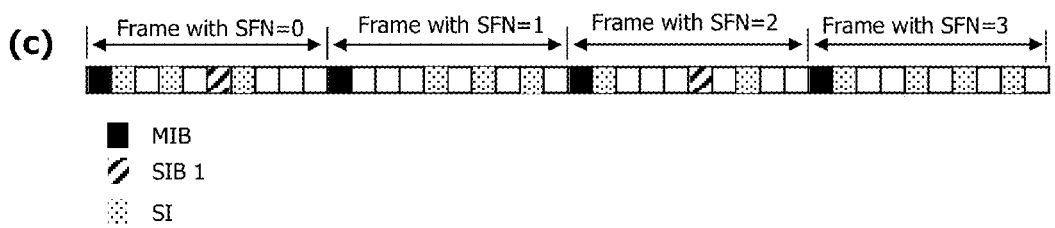

FIG. 20 illustrates a process of transferring system information.

Referring to FIG. 20(a), let's assumed that while servicing the uplink assigned as 1920 MHz~1980 MHz, and the downlink assigned as 2110 MHz~2170 MHz in the operating band 1 shown in Table 2 representing the operator A, the operator B services by being assigned as the 1884.5 MHz to 1915.7 MHz. The band of 1884.5 MHz to 1915.7 MHz is used in Japan for a personal handy-phone system (PHS).

In such circumstance, as shown in FIG. 20(b), the base station 200 of the operator A transmits a master information block (MIB) and a system information block (SIB) to the terminal 100.

The system information block (SIB) may include one or more of information about the operating band while using by own of the operating bands shown in Table 2, information about the uplink (UL) bandwidth, and information about the uplink (UL) carrier frequency. The information about the uplink (UL) bandwidth may include the number of the resource block (RB). In the example of FIG. 20, the terminal 100 receives information about the operating band 1 through the system information block (SIB).

On the other hand, the terminal 100 receives the setting on the CA from the base station 200. In this case, the set CA is corresponded to an intra-band continuous CA. In addition, the bandwidth class of the CA is corresponded to the C class of Table 3. Accordingly, the terminal 100 operates according to the CA_1C.

If such the terminal 100 receives the network signal, for example, CA_NS_01 from the base station 200, the transmission performs by applying the A-MPR according to Table 12 or Table 13.

On the other hand, referring to FIG. 20(c), the sub-frames where the MIB, the SIB and the SI are transmitted represent for illustrative purposes. The MIB and the SIB are transmitted with a period of 40 ms and 80 ms, respectively. The SI messages are transmitted with another period according to a schedule. In FIG. 20(c), it is shown that the MIB, SIB and Sis are all transmitted on the radio frame that the system frame number (SFN) is zero, as an example.

The embodiments of the present invention described above may be implemented through a variety of means. For example, the embodiments of the present invention may be implemented by hardware, a firmware, software or a combination thereof.

Figure 21:
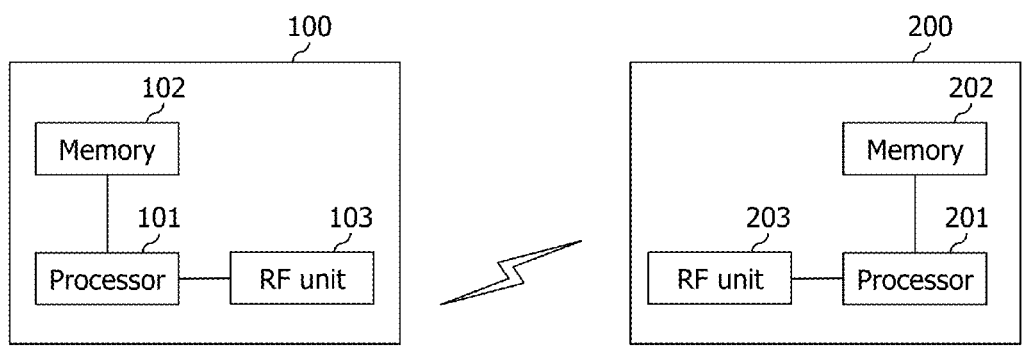
FIG. 21 is a block diagram showing a wireless communication system to implement an embodiment of the present invention.

FIG. 21 is a block diagram showing a wireless communication system to implement an embodiment of the present invention.

A terminal 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the terminal may be implemented by the processor 101.

A BS 200 includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the BS may be implemented by the processor 201.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for reducing transmission power, the method comprising:
    if a carrier aggregation (CA) is configured and if the configured CA corresponds to an intra-band contiguous CA, receiving a network signal; and
    applying an additional maximum power reduction (A-MPR) for a transmission, based on the network signal,
    wherein if the intra-band contiguous CA is configured for an operating band 1 defined in third generation partnership project (3GPP), if an aggregated transmission bandwidth is the summation of 15 MHz including 75 resource blocks (RBs) and 15 MHz including 75 RBs, if RBs start from 0-6 or 143-149 and if $L\_{CRB}<=10$, a value of the A-MPR is a specific integer value,
    wherein if the intra-band contiguous CA is configured for an operating band 1 defined in 3GPP, if the aggregated transmission bandwidth is the summation of 15 MHz including 75 RBs and 15 MHz including 75 RBs, if RBs start from 7-90 and if $L\_{CRB}>44$, a value of the A-MPR is an integer value smaller than the specific integer value, and
    where $L\_{CRB}$ is a length of a contiguous RB allocation.

2. The method of claim 1, further comprising:
receiving information on an uplink resource allocated by a base station.

3. The method of claim 1, further comprising:
receiving system information from a base station,
    wherein the system information contains at least one of:
        information on an operating band,
        information on an uplink bandwidth, and
        information on an uplink carrier frequency, and
    wherein the information on the uplink bandwidth contains information on a number of RBs.

4. The method of claim 1, wherein,
if the aggregated transmission bandwidth is the summation of 15 MHz including 75 RBs and 15 MHz including 75 RBs, if RBs start from 0-6 or 143-149 and if $L\_{CRB}>10$, the value of the A-MPR is about 6 dB.

5. The method of claim 1,
    wherein if the intra-band contiguous CA is configured for the operating band 1 defined in 3GPP, if the aggregated transmission bandwidth is the summation of 15 MHz including 75 RBs and 15 MHz including 75 RBs, if RBs start from 0-6 or 143-140 and if $L\_{CRB}<=10$, the value of the A-MPR is about 11 dB, and
    wherein if the intra-band contiguous CA is configured for the operating band 1 defined in 3GPP, if the aggregated transmission bandwidth is the summation of 15 MHz including 75 RBs and 15 MHz including 75 RBs, if RBs start from 7-90 and if $L\_{CRB}>44$, the value of the A-MPR is about 5 dB.

6. The method of claim 1,
    wherein if the aggregated transmission bandwidth is the summation of 100 RBs and 100 RBs and if $L\_{CRB}>0$, the value of the A-MPR is about 12 dB, and
    wherein if the aggregated transmission bandwidth is the summation of 100 RBs and 100 RBs and if $L\_{CRB}>64$, the value of the A-MPR is about 6 dB.

7. A terminal for performing an uplink transmission with reduced transmission power, the terminal comprising:
    a radio frequency (RF) unit configured to receive a network signal, if a carrier aggregation (CA) is configured and if the configured CA corresponds to an intra-band contiguous CA; and a processor configured to apply an additional maximum power reduction (A-MPR) for a transmission, based on the network signal, wherein if the intra-band contiguous CA is configured for an operating band 1 defined in third generation partnership project (3GPP), if an aggregated transmission bandwidth is the summation of 15 MHz including 75 resource blocks (RBs) and 15 MHz including 75 RBs, if RBs start from 0-6 or 143-149 and if $L_{\_CRB}\leq=10$, a value of the A-MPR is a specific integer value, wherein if the intra-band contiguous CA is configured for an operating band 1 defined in 3GPP, if the aggregated transmission bandwidth is the summation of 15 MHz including 75 RBs and 15 MHz including 75 RBs, if RBs start from 7-90 and if $L_{\_CRB}>44$, a value of the A-MPR is an integer value smaller than the specific integer value, and where $L_{\_CRB}$ is a length of a contiguous resource block allocation.

8. The terminal of claim 7, wherein, if the aggregated transmission bandwidth is the summation of 15 MHz including 75 RBs and 15 MHz including 75 RBs, if RBs start from 0-6 or 143-149 and if $L_{\_CRB}>10$, the value of the A-MPR is about 6 dB.

9. The terminal of claim 7, wherein if the intra-band contiguous CA is configured for the operating band 1 defined in 3GPP, if the aggregated transmission bandwidth is the summation of 15 MHz including 75 RBs and 15 MHz including 75 RBs, if RBs start from 0-6 or 143-149 and if $L_{\_CRB}\leq=10$, the value of the A-MPR is about 11 dB, and wherein if the intra-band contiguous CA is configured for the operating band 1 defined in 3GPP, if the aggregated transmission bandwidth is the summation of 15 MHz including 75 RBs, if RBs start from 7-90 and 15 MHz including 75 RBs and if $L_{\_CRB}>44$, the value of the A-MPR is about 5 dB.

10. The terminal of claim 7, wherein if the aggregated transmission bandwidth is the summation of 100 RBs and 100 RBs and if $L_{\_CRB}>0$, the value of the A-MPR is about 12 dB, and wherein if the aggregated transmission bandwidth is the summation of 100 RBs and 100 RBs and if $L_{\_CRB}>64$, the value of the A-MPR is about 6 dB.

* * * * *